United States Patent [19]
Maki et al.

[11] Patent Number: 5,720,265
[45] Date of Patent: Feb. 24, 1998

[54] FUEL METERING CONTROL SYSTEM FOR INTERNAL COMBUSTION ENGINE

[75] Inventors: Hidetaka Maki; Shusuke Akazaki; Yusuke Hasegawa; Yoichi Nishimura, all of Wako, Japan

[73] Assignee: Honda Giken Kogyo Kabushiki Kaisha, Tokyo, Japan

[21] Appl. No.: 514,632

[22] Filed: Aug. 14, 1995

[30]  Foreign Application Priority Data

Feb. 25, 1995 [JP] Japan ............................ 7-061657

[51] Int. Cl.$^6$ ................................................ F02D 41/14
[52] U.S. Cl. .................... 123/680; 123/684; 123/686; 123/687; 123/694; 123/696
[58] Field of Search ........................ 123/679–687, 123/694, 696

[56] References Cited

U.S. PATENT DOCUMENTS

| | | | |
|---|---|---|---|
| 5,343,701 | 9/1994 | Douta et al. | 123/680 |
| 5,558,075 | 9/1996 | Maki et al. | 123/680 |

FOREIGN PATENT DOCUMENTS

| | | | |
|---|---|---|---|
| 3321424 | 8/1984 | Germany | 123/694 |
| 58-32945 | 2/1983 | Japan | 123/680 |
| 2-275043 | 11/1990 | Japan . | |
| 4-209940 | 7/1992 | Japan . | |
| 5-52140 | 3/1993 | Japan . | |

OTHER PUBLICATIONS

Computrol (Corona Publishing Co., Ltd.) No. 27, pp. 28–41, published Jul. 10, 1989.

Automatic Control Handbook (Ohm Publishing Co., Ltd.) pp. 703–707, published Oct. 30, 1983.

"A Survey of Model Reference Adaptive Techniques —Theory and Applications" by I.D. Landau In Automatica, vol. 10, pp. 353–379 published Jun. 18–21 1973.

"Unification of Discrete Time Explicit Model Reference Adaptive Control Designs" by I.D. Landau et al. In Automatica, vol. 17, No. 4, pp. 593–611, 1981.

"Combining Model Reference Adaptive Controller and Strochastic Self–tuning Regulators" by I.D. Landau In Automatica vol. 18, No. 1, pp. 77–84, published Aug. 1981.

U.S. Serial No. 08/401,430 filed Mar. 9, 1995 by Maki et al.

Primary Examiner—Andrew M. Dolinar
Attorney, Agent, or Firm—Nikaido Marmelstein Murray & Oram LLP

[57] ABSTRACT

A fuel metering control system for an internal combustion engine, having a feedback loop. In the system, the quantity of fuel injection (Tim) to be supplied to the engine (plant) is determined outside of the feedback loop. A first feedback correction coefficient (KSTR) is calculated using an adaptive law, while a second feedback correction coefficient (KLAF), whose control response is inferior to that of the first feedback correction coefficient, is calculated using a PID control law. The feedback correction coefficients are calculated such that the plant output (air/fuel ratio) is brought to a desired value (desired air/fuel ratio). The coefficients are calculated at least in parallel and either of them is selected to be multiplied by the quantity of fuel injection (Ti).

73 Claims, 11 Drawing Sheets

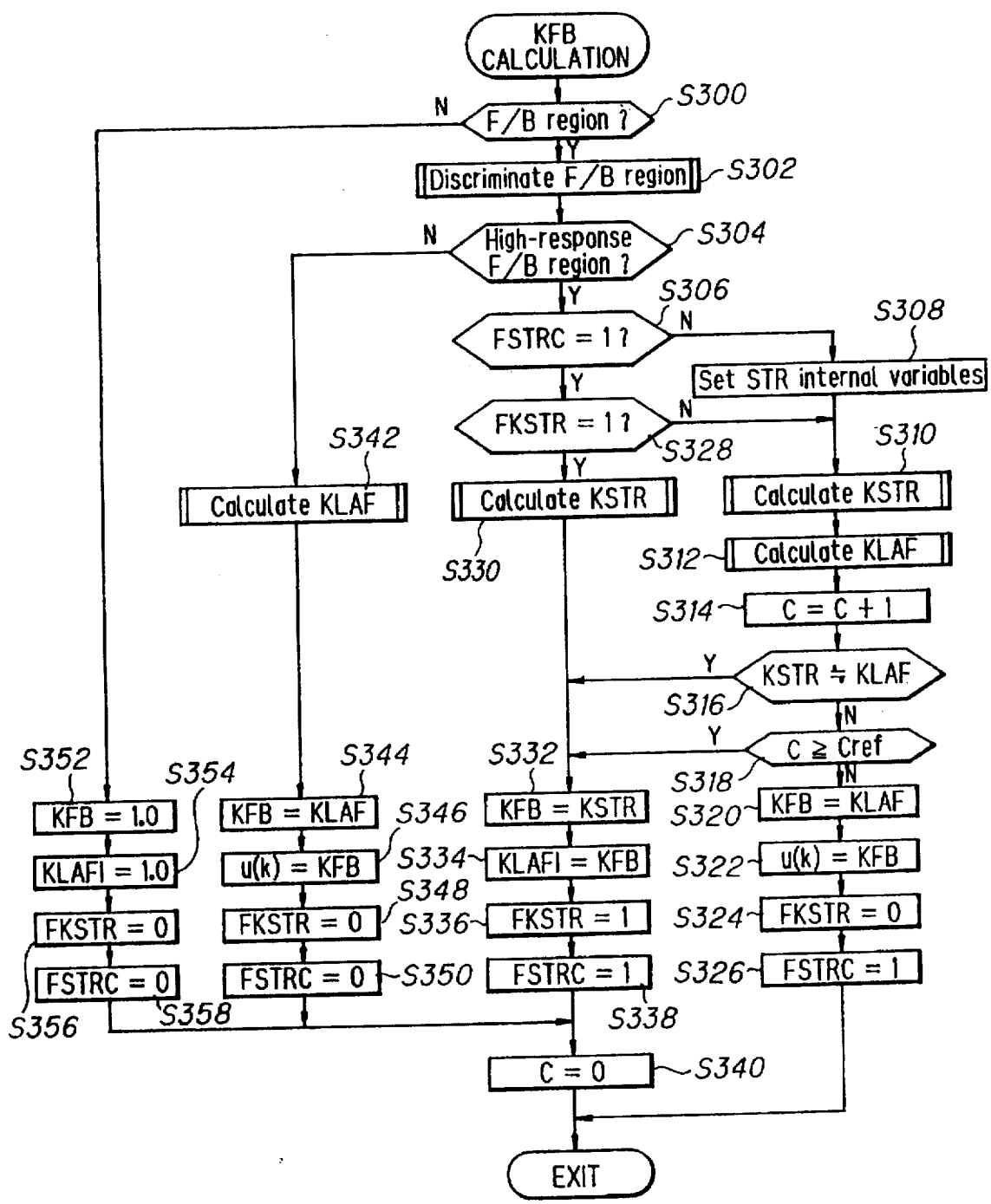

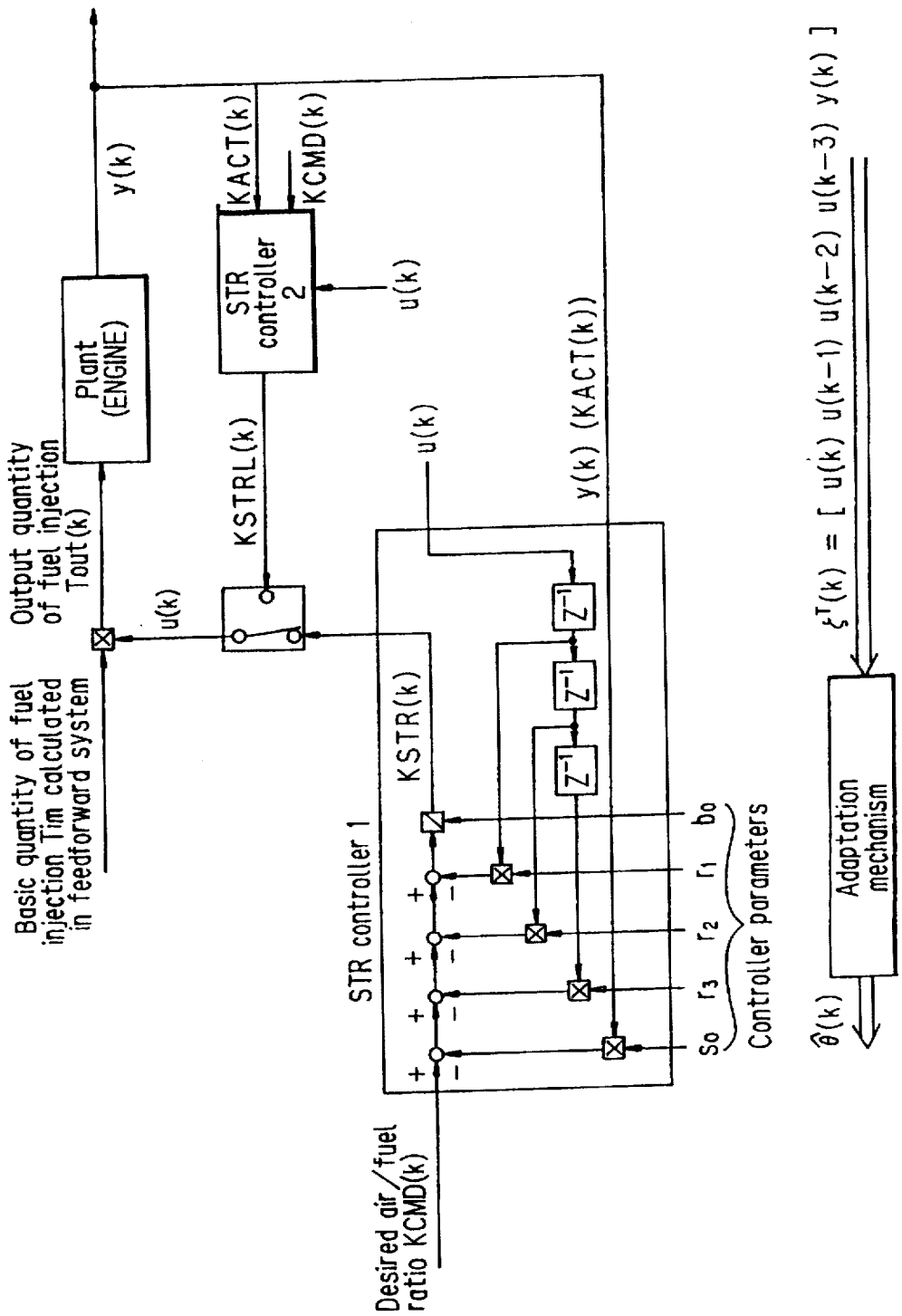

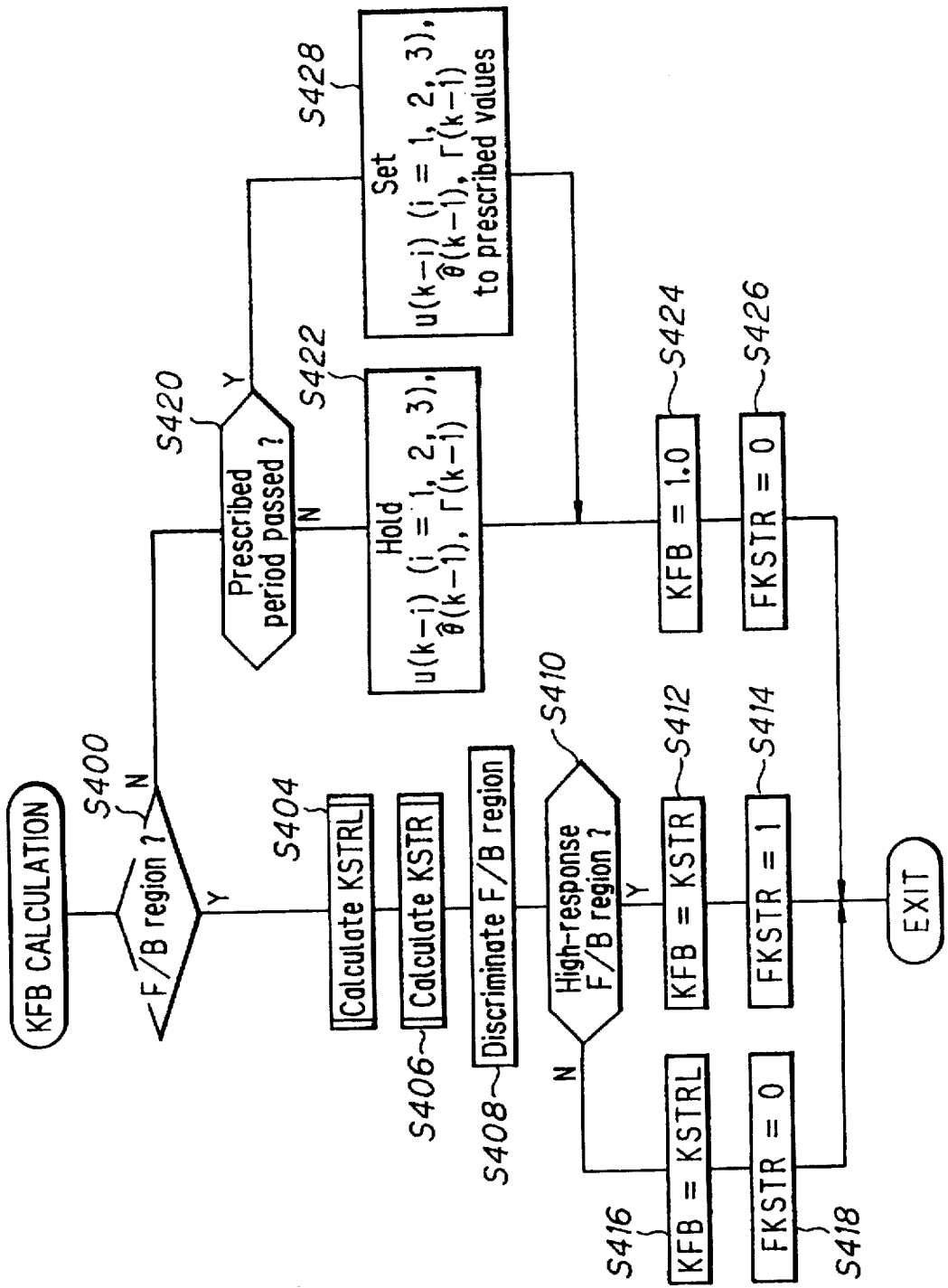

FUEL METERING CONTROL SYSTEM FOR INTERNAL COMBUSTION ENGINE

BACKGROUND OF THE INVENTION

1. Field of the Invention

This invention relates to a fuel metering control system for an internal combustion engine.

2. Description of the Prior Art

The PID control law is ordinarily used for fuel metering control for internal combustion engines. The control error between the desired value and the controlled variable is multiplied by a P term (proportional term), an I term (integral term) and a D term (differential or derivative term) to obtain the feedback correction coefficient (feedback gain). In addition, it has recently been proposed to obtain the feedback correction coefficient by use of modern control theory or the like. As the control response is relatively high in such cases, however, it may under some engine operating conditions become necessary to use a lower control response feedback correction coefficient in order to prevent the control from becoming unstable owing to controlled variable fluctuation or oscillation.

It has therefore been proposed, as in Japanese Laid-Open Patent Application No. Hei 4(1992)-209,940, to calculate a first feedback correction coefficient using modern control theory, calculate a second feedback correction coefficient whose control response is inferior to (or lesser than) that of the first feedback correction coefficient using the PI control law, and determine the manipulated variable using the second feedback correction coefficient during engine deceleration, when combustion is unstable. For a similar reason, Japanese Laid-Open Patent Application No. Hei 5(1993)-52,140 proposes determining the controlled variable using a second feedback correction coefficient of inferior control response when the air/fuel ratio sensor is in the semi-activated state. In Japanese Patent Application No. Hei 6(1994)-66,594 (filed in the United States on Mar. 9, 1995 under the Ser. No. of 08/401,430), for example, the assignee proposes a system for determining the quantity of fuel injection using an adaptive controller.

In fuel metering control, the supply of fuel is shut off during cruising and certain other operating conditions and, as shown in FIG. 11, it is controlled in an open-loop (O/L) fashion during the fuel cutoff period. Then when the fuel supply is resumed for obtaining a stoichiometric air/fuel ratio (14.7:1), for example, fuel is supplied based on the quantity of fuel injection determined in accordance with an empirically obtained characteristic. As a result, the true air/fuel ratio (A/F) jumps from the lean side to 14.7:1. However, a certain amount of time is required for the supplied fuel to be combusted and for the combusted gas to reach the air/fuel ratio sensor. In addition, the air/fuel ratio sensor has a detection delay time. Because of this, the detected air/fuel ratio is not always the same as the true air/fuel ratio but, as shown by the broken line in FIG. 11, involves a relatively large error.

At this time, as soon as the high-control-response feedback correction coefficient (illustrated as KSTR in the figure) is determined based on a control law such as the adaptive control law proposed by the assignee, the adaptive controller determines the feedback correction coefficient KSTR so as to immediately eliminate the error between the desired value and the detected value. As this difference is caused by the sensor detection delay and the like, however, the detected value does not indicate the true air/fuel ratio.

Since the adaptive controller nevertheless absorbs the relatively large difference all at one time, KSTR fluctuates widely as shown in FIG. 11, thereby also causing the controlled variable to fluctuate or oscillate and degrading the control stability.

The occurrence of this problem is not limited to only at the resumption of fuel supply following cutoff. It also arises at the time of resuming feedback control following full-load enrichment and of resuming stoichiometric air/fuel ratio control following lean-burn control. It also occurs when switching from perturbation control in which the desired air/fuel ratio is deliberately fluctuated to control using a fixed desired air/fuel ratio. In other words, the problem arises whenever a large variation occurs in the desired air/fuel ratio. None of the aforesaid prior art references offer any measure for overcoming this problem.

It is therefore preferable to determine one feedback correction coefficient of high control response using a control law such as the adaptive control law and another feedback correction coefficient of low control response using a control law such as the PID control law (illustrated as KLAF in the figure) and to select one or the other of the feedback correction coefficients depending on the engine operating condition. Since the different types of control law have different characteristics, however, a sharp difference in level may arise between the two correction coefficients. Because of this, switching between the correction coefficients is liable to destabilize the controlled variable and degrade the control stability.

A first object of the invention is therefore to provide a fuel metering control system for an internal combustion engine which determines feedback correction coefficients different in control response using multiple types of control laws and which smooths the switching between the feedback correction coefficients, thereby improving fuel metering and air/fuel ratio control performance while ensuring control stability.

The aforesaid level difference between the correction coefficients is particularly pronounced at the time of switching from the feedback correction coefficient of low control response to the feedback correction coefficient of high-response.

A second object of the invention is therefore to provide a fuel metering control system for an internal combustion engine which determines feedback correction coefficients different in control response using multiple types of control laws, which selects one thereof in accordance with the engine operating condition, and particularly which smooths the switching from the feedback correction coefficient of low control response to the feedback correction coefficient of high control response, thereby improving fuel metering and air/fuel ratio control performance while ensuring control stability.

Although control performance can be improved by determining feedback correction coefficients different in control response using multiple types of control laws and by selecting among them in accordance with the engine operating condition, the processing (calculation) volume increases proportionally. This is undesirable when the available processing time is short, as when the engine is operating at high speed.

A third object of the invention is therefore to provide a fuel metering control system for an internal combustion engine which determines feedback correction coefficients different in control response using multiple types of control laws, which selects one thereof in accordance with the engine operating condition, and which reduces the processing (calculation) volume as much as possible to thereby ensure the desired control performance when the available processing time is short owing to high-speed engine operation or the like.

SUMMARY OF THE INVENTION

This invention achieves these objects by providing a system for controlling fuel metering for an internal combustion engine, comprising, air/fuel ratio detecting means for detecting an air/fuel ratio (KACT) of an exhaust gas of the engine, engine operating condition detecting means for detecting an operating condition of the engine, fuel injection quantity determining means for determining a quantity of fuel injection (Tim) to be supplied to the engine, first feedback correction coefficient calculation means for calculating a first feedback correction coefficient (KSTR) using a first control law having an algorithm expressed in a recursion formula, second feedback correction coefficient calculation means for calculating a second feedback correction coefficient (KLAF(KSTRL)) whose control response is inferior to that of the first feedback correction coefficient using a second control law, switching means for switching the first feedback correction coefficient (KSTR) and the second feedback correction coefficient (KLAF(KSTRL)) therebetween, and feedback control means for correcting a manipulated variable by the switched one of the feedback correction coefficients (KSTR, KLAF(KSTRL)) to bring at least one of the detected air/fuel ratio (KACT) and the quantity of fuel injection (Tim) to a desired value (KCMD). The characteristic feature is that said first and second feedback correction coefficient calculation means calculate the feedback correction coefficients (KSTR, KLAF (KSTRL)) at least parallel with each other.

BRIEF EXPLANATION OF THE DRAWINGS

These and other objects and advantages of the invention will be more apparent from the following description and drawings, in which:

FIG. 8 is a subroutine flowchart, similar to FIG. 6, but showing the calculation of the feedback correction coefficient KFB according to a second embodiment of the invention;

FIG. 9 is a block diagram, similar to FIG. 5, but showing the configuration of the system according to a third embodiment of the invention;

FIG. 10 is a subroutine flowchart, similar to FIG. 6, but showing the calculation of the feedback correction coefficient KFB according to the third embodiment of the invention.

DETAILED DESCRIPTION OF THE PREFERRED EMBODIMENTS

Embodiments of the invention will now be explained with reference to the drawings.

Figure 1:
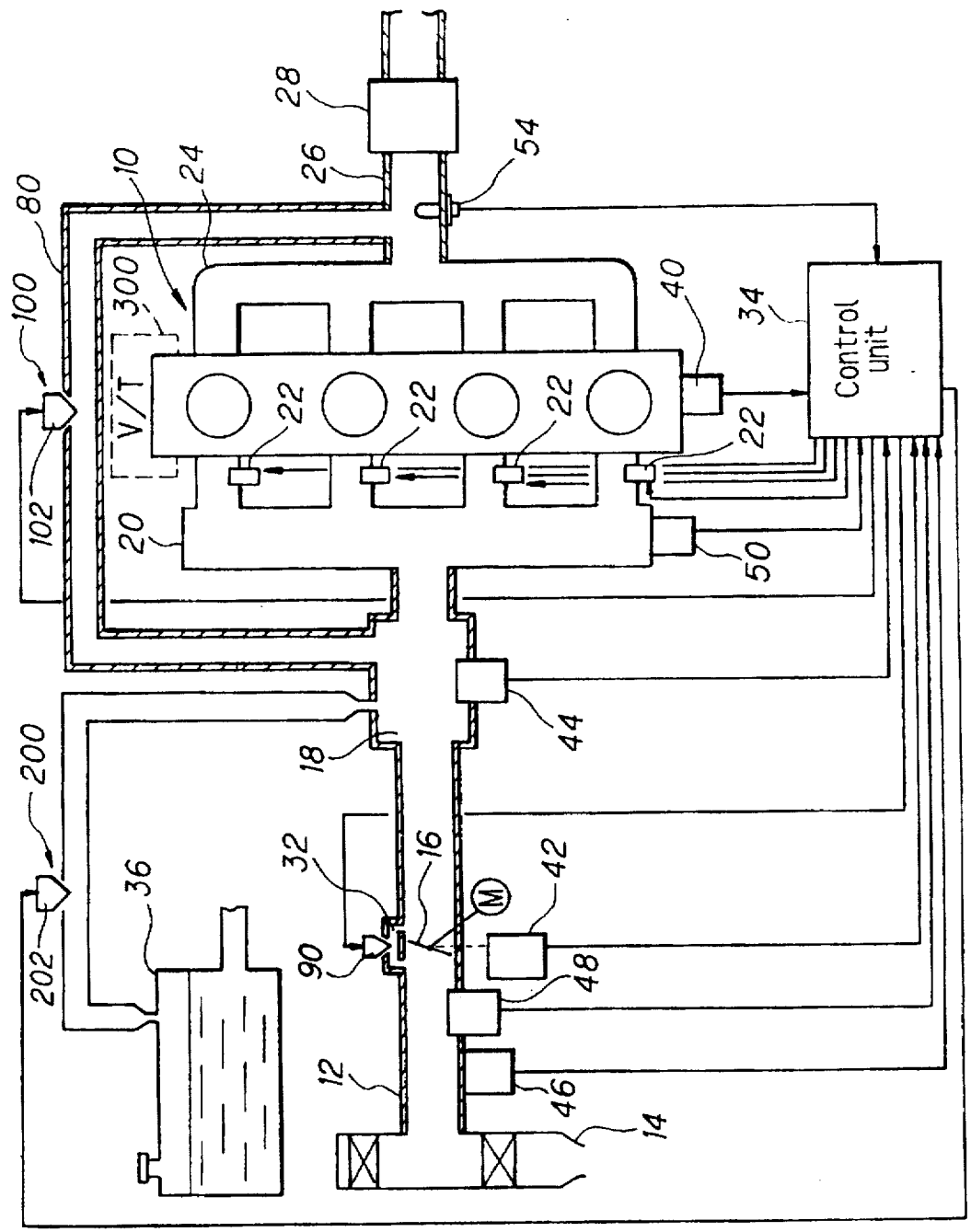
FIG. 1 is an overall block diagram showing a fuel metering control system according to the invention.

FIG. 1 is an overview of a fuel metering control system for an internal combustion engine according to the invention.

Reference numeral 10 in this figure designates an OHC in-line four-cylinder internal combustion engine. Air drawn in an air intake pipe 12 through an air cleaner 14 mounted on a far end thereof is supplied, while being adjusted by a throttle valve 16, to the first to fourth cylinders through a surge tank 18, an intake manifold 20 and two intake valves (not shown). A fuel injector 22 for injecting fuel is installed in the vicinity of the intake valves of each cylinder. The injected fuel mixes with the intake air to form an air-fuel mixture that is ignited in the associated cylinder by a spark plug (not shown). The resulting combustion of the air-fuel mixture drives down a piston (not shown).

The exhaust gas produced by the combustion is discharged through two exhaust valves (not shown) into an exhaust manifold 24, from where it passes through an exhaust pipe 26 to a catalytic converter (three-way catalyst) 28 where noxious components are removed therefrom before being discharged to the atmosphere. Not mechanically linked with the accelerator pedal (not shown), the throttle valve 16 is controlled to the desired degree of opening by a stepping motor M. In addition, the throttle valve 16 is bypassed by a bypass 32 provided in the vicinity thereof.

The engine 10 is equipped with an exhaust gas recirculation mechanism 100 and with a canister purge mechanism 200 connected between the air intake system and a fuel tank 36. Since these mechanisms are unrelated to the principle of the invention, however, they will not be explained in detail.

Figure 2:
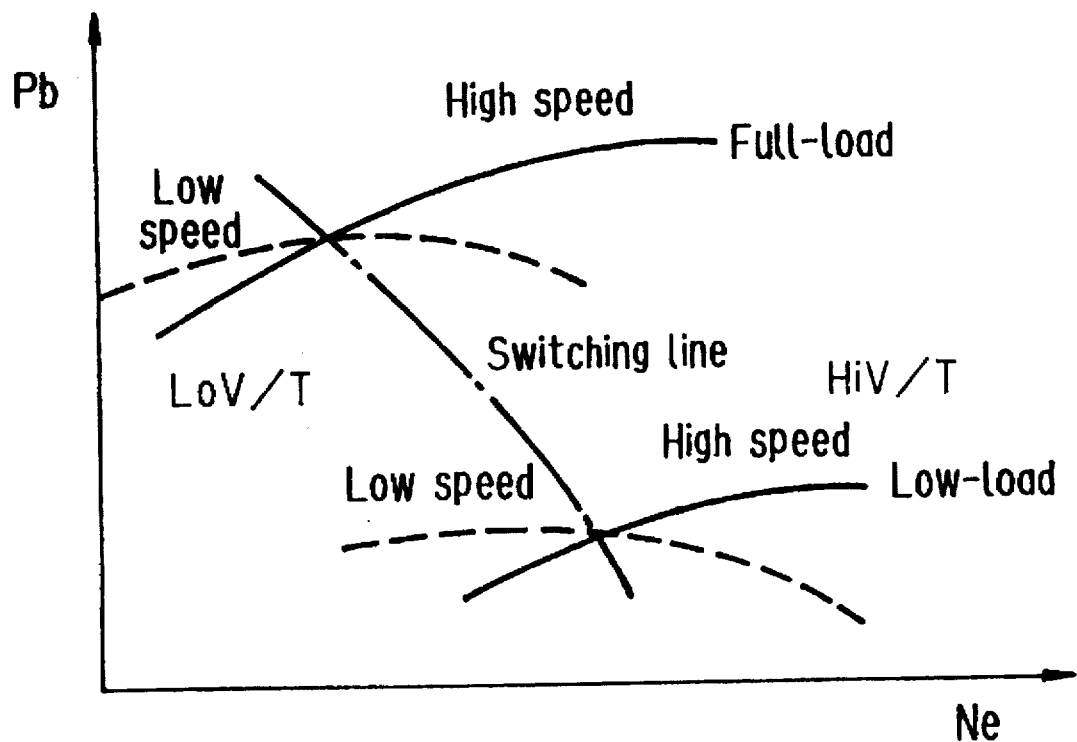
FIG. 2 is a graph showing the valve timing switching characteristics of a variable valve timing mechanism provided with the engine shown in FIG. 1.

The engine 10 is also equipped with a variable valve timing mechanism 300 (denoted as V/T in FIG. 1). As taught by Japanese Laid-open Patent Application No. Hei 2(1990) -275,043, for example, the variable valve timing mechanism 300 switches the opening/closing timing of the intake and/or exhaust valves between two types of timing characteristics, i.e., the characteristic for low engine speed named LoV/T and that for high engine speed named HiV/T as illustrated in FIG. 2 in response to engine speed Ne and manifold pressure Pb. Since this is a well-known mechanism, however, it will not be described further here. (Among the different ways of switching between valve timing characteristics is included that of deactivating one of the two intake valves.)

A crank angle sensor 40 for detecting the piston crank angles is provided in the distributor (not shown) of the internal combustion engine 10, a throttle position sensor 42 is provided for detecting the degree of opening of the throttle valve 16, and a manifold absolute pressure sensor 44 is provided for detecting the pressure of the intake manifold downstream of the throttle valve 16 in terms of the absolute value.

An atmospheric pressure sensor 46 for detecting atmospheric pressure is provided at an appropriate portion of the engine 10, an intake air temperature sensor 48 for detecting the temperature of the intake air is provided upstream of the throttle valve 16, and a coolant temperature sensor 50 for detecting the temperature of the engine coolant is provided at an appropriate portion of the engine. The engine 10 is further provided with a valve timing (V/T) sensor 52 (not shown in FIG. 1) which detects the valve timing characteristic selected by the variable valve timing mechanism 300 based on oil pressure.

Further, an air/fuel ratio sensor 54 constituted as an oxygen detector or oxygen sensor, is provided at the exhaust pipe 26 at, or downstream of, a confluence point in the exhaust system between the exhaust manifold 24 and the catalytic converter 28, where it detects the oxygen concentration in the exhaust gas at the confluence point and produces a signal (explained later). The outputs of all the sensors are sent to a control unit 34.

Figure 3:
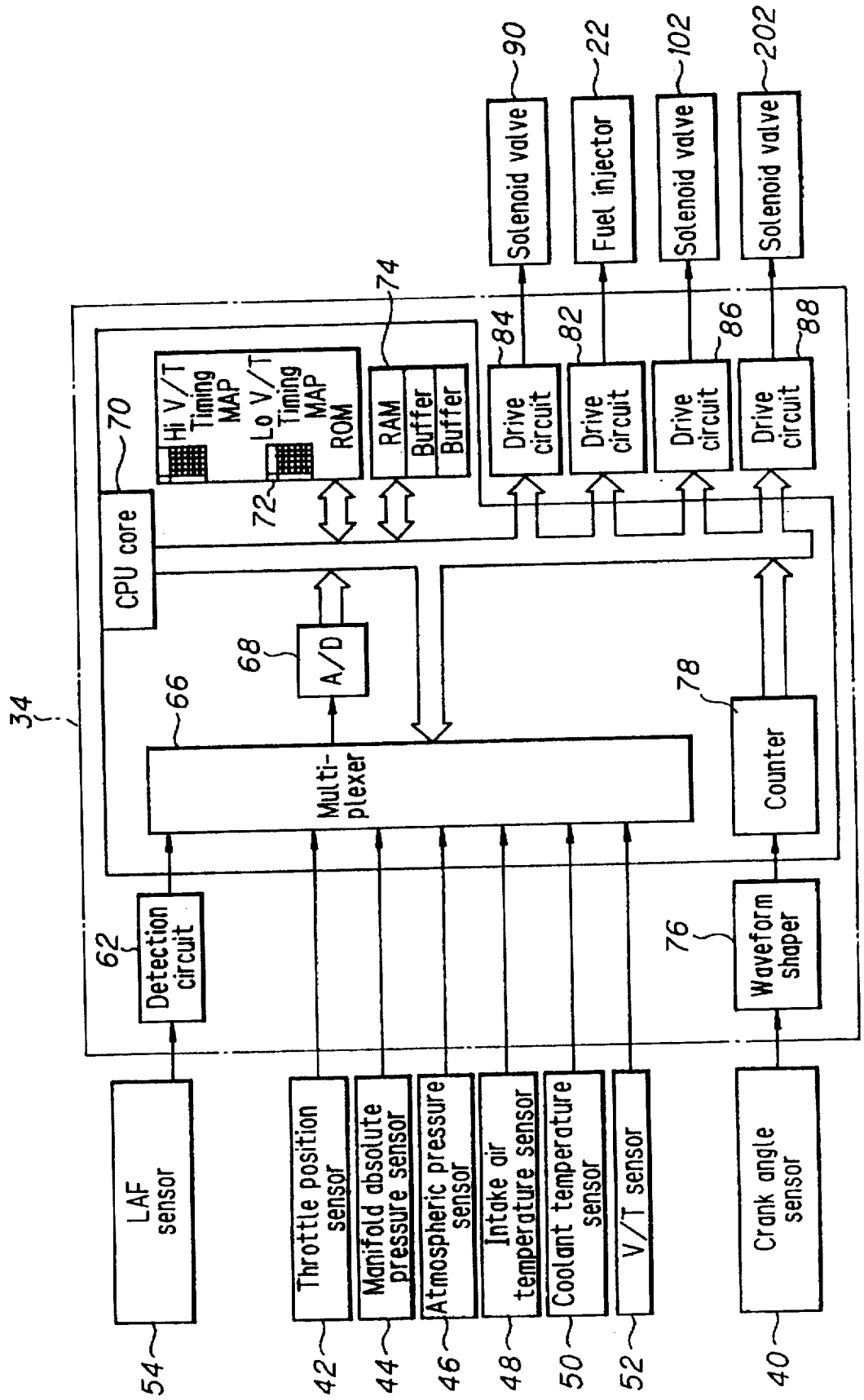
FIG. 3 is a block diagram showing the details of the control unit illustrated in FIG. 1.

Details of the control unit 34 are shown in the block diagram of FIG. 3. The output of the air/fuel ratio sensor 54 is received by a detection circuit 62, where it is subjected to appropriate linearization processing for producing an output characterized in that it varies linearly with the oxygen concentration of the exhaust gas over a broad range extending from the lean side to the rich side. (The air/fuel ratio sensor will be referred to as "LAF sensor" in the figure and the remainder of this specification.)

The output of the detection circuit 62 is forwarded through a multiplexer 66 and an A/D converter 68 to a CPU (central processing unit). The CPU has a CPU core 70, a ROM (read-only memory) 72 and a RAM (random access memory) 74 and the output of the detection circuit 62 is A/D-converted once every prescribed crank angle (e.g., 15 degrees) and sequentially stored in buffers of the RAM 74. Similarly, the analog outputs of the throttle position sensor, 42 etc., are input to the CPU through the multiplexer 66 and the A/D converter 68 and stored in the RAM 74.

The output of the crank angle sensor 40 is shaped by a waveform shaper 76 and has its output value counted by a counter 78. The result of the count is input to the CPU. In accordance with commands stored in the ROM 72, the CPU core 70 computes a manipulated variable in the manner described later and drives the fuel injectors 22 of the respective cylinders via a drive circuit 82. Operating via drive circuits 84, 86 and 88, the CPU core 70 also energizes/deenergizes a solenoid valve (EACV) 90 (for opening and closing the bypass 32 to regulate the amount of secondary air), a solenoid valve 102 for controlling the amount of recirculated exhaust gas, and a solenoid valve 202 for controlling the amount of canister purge.

Figure 4:
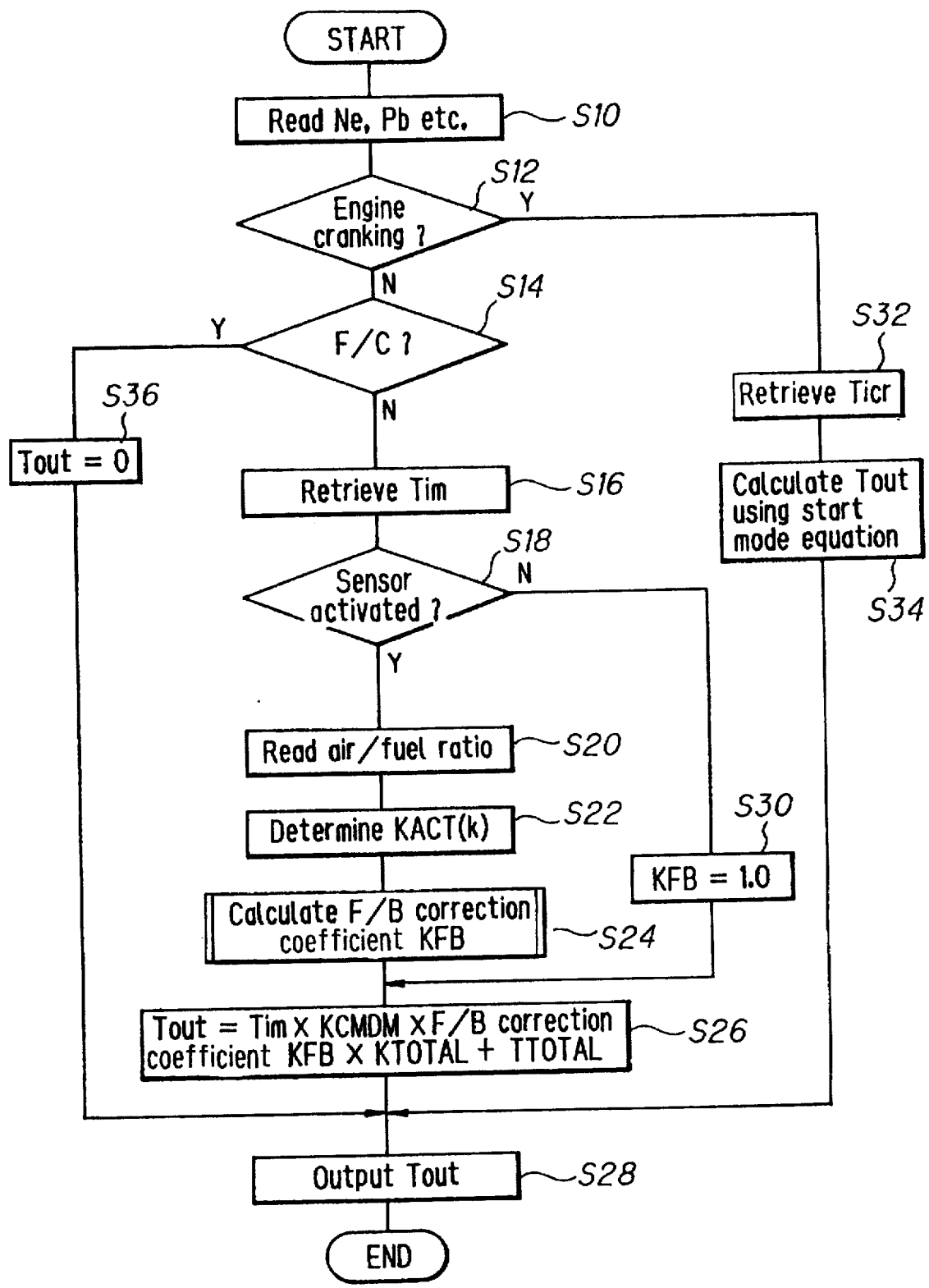
FIG. 4 is a flowchart showing the operation of the fuel metering control system according to the invention.

FIG. 4 is a flowchart showing the operation of the system. The routine of FIG. 4 is activated once every prescribed crank angle.

Figure 5:
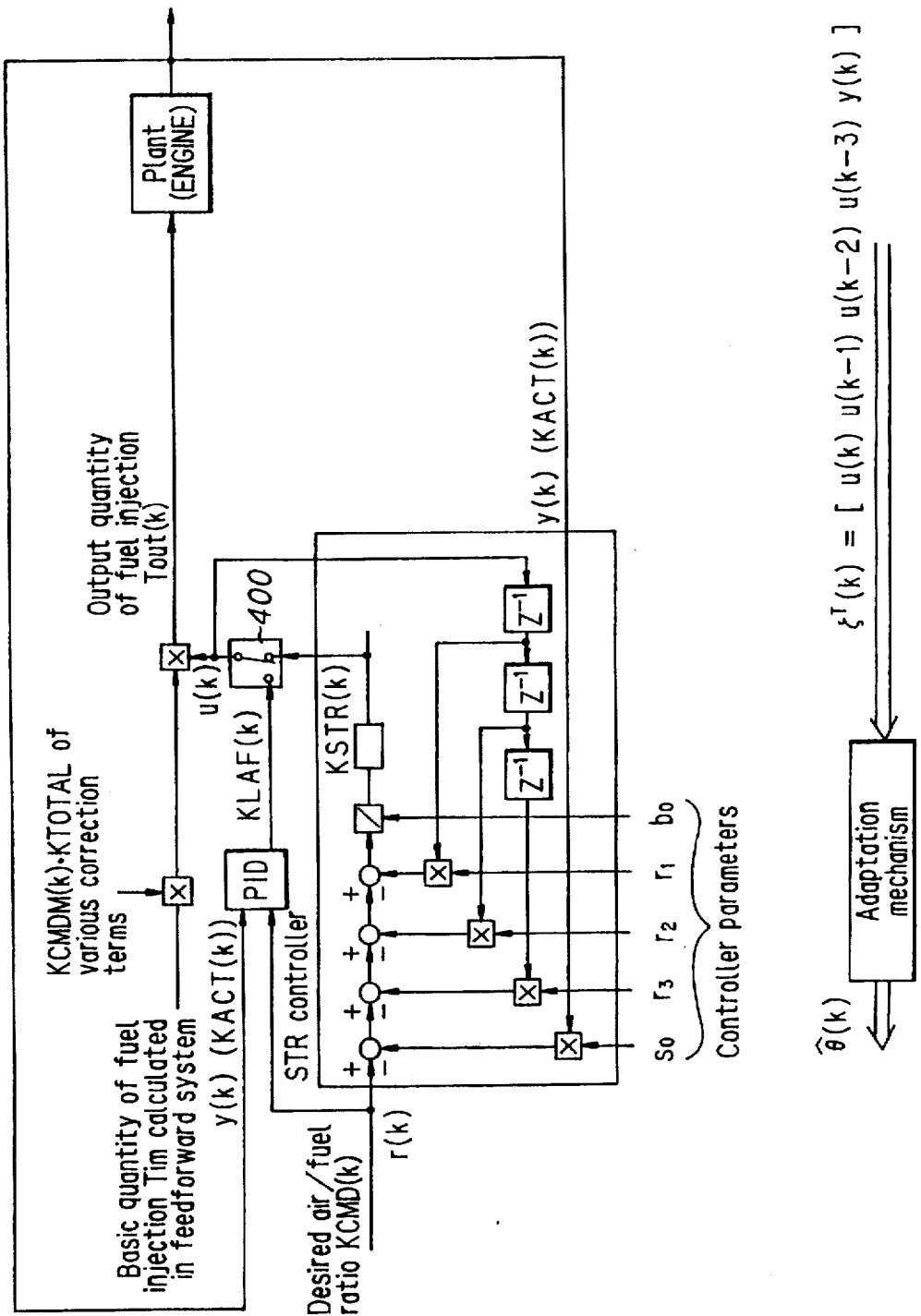
FIG. 5 is a block diagram similarly showing the operation of the system more functionally.

FIG. 5 is a block diagram illustrating the operation of the system more functionally. First explaining the system with reference to FIG. 5, the system is provided with a first calculation means constituted as an adaptive controller (STR type adaptive controller; indicated as an "STR controller" in the figure), which uses the adaptive control law based on a recursion formula to calculate a first feedback correction coefficient (indicated as "KSTR(k)" in the figure) so as to bring the detected air/fuel ratio (indicated as "KACT(k)") to a desired air/fuel ratio (indicated as "KCMD(k)") using the quantity of fuel injection as the manipulated variable (k: the sample number in discrete-time system).

In addition, the system is provided with a second calculation means constituted as a PID controller (indicated as "PID" in the figure), which uses a second type of control law, specifically, which uses the PID control law, to calculate a second feedback correction coefficient (indicated as "KLAF(k)"), that is inferior in control response (lesser in control response) than the first feedback correction coefficient, so as to cause the detected air/fuel ratio KACT to equal the desired value KCMD similarly using the quantity of fuel injection as the manipulated variable. The output of the first calculation means or the second calculation means is selected based on the engine operating condition detected in the manner described latter, and the basic quantity of fuel injection Tim (calculated in a feed-forward system in accordance with an empirically determined characteristic and stored as mapped data retrievable by engine speed and manifold pressure) is multiplied by the selected coefficient to obtain the output quantity of fuel injection Tout.

Based on the above, the operation of the system will be explained with reference to FIG. 4.

In FIG. 4, the program starts at S10 in which the detected engine speed Ne and manifold pressure Pb, etc., are read, and proceeds to S12 in which a check is made as to whether or not the engine is cranking, and if it is not, to S14 in which a check is made as to whether the supply of fuel has been cut off. Fuel cutoff is implemented under specific engine operating conditions, such as when the throttle is fully closed and the engine speed is higher than a prescribed value, at which time the supply of fuel is stopped and open-loop control is effected.

If it is found in S14 that fuel cutoff is not implemented, the program proceeds to S16 in which the basic quantity of fuel injection Tim is calculated by retrieval from the aforesaid map using the detected engine speed Ne and manifold pressure Pb as address data. Next, the program proceeds to S18 in which it is checked whether activation of the LAF sensor 54 is complete. This is done by comparing the difference between the output voltage and the center voltage of the LAF sensor 54 with a prescribed value (0.4 V, for example) and determining that activation is complete when the difference is smaller than the prescribed value.

If S18 finds that activation is complete, the program goes to S20 in which the output of the LAF sensor is read, to S22 in which the air/fuel ratio KACT(k) is determined or calculated from the output, and to S24 in which the feedback correction coefficient KFB (the general name for KSTR and KLAF) is calculated. As mentioned earlier, k is used to mean a discrete variable in the specification and the sample number in the discrete-time system.

Figure 6:
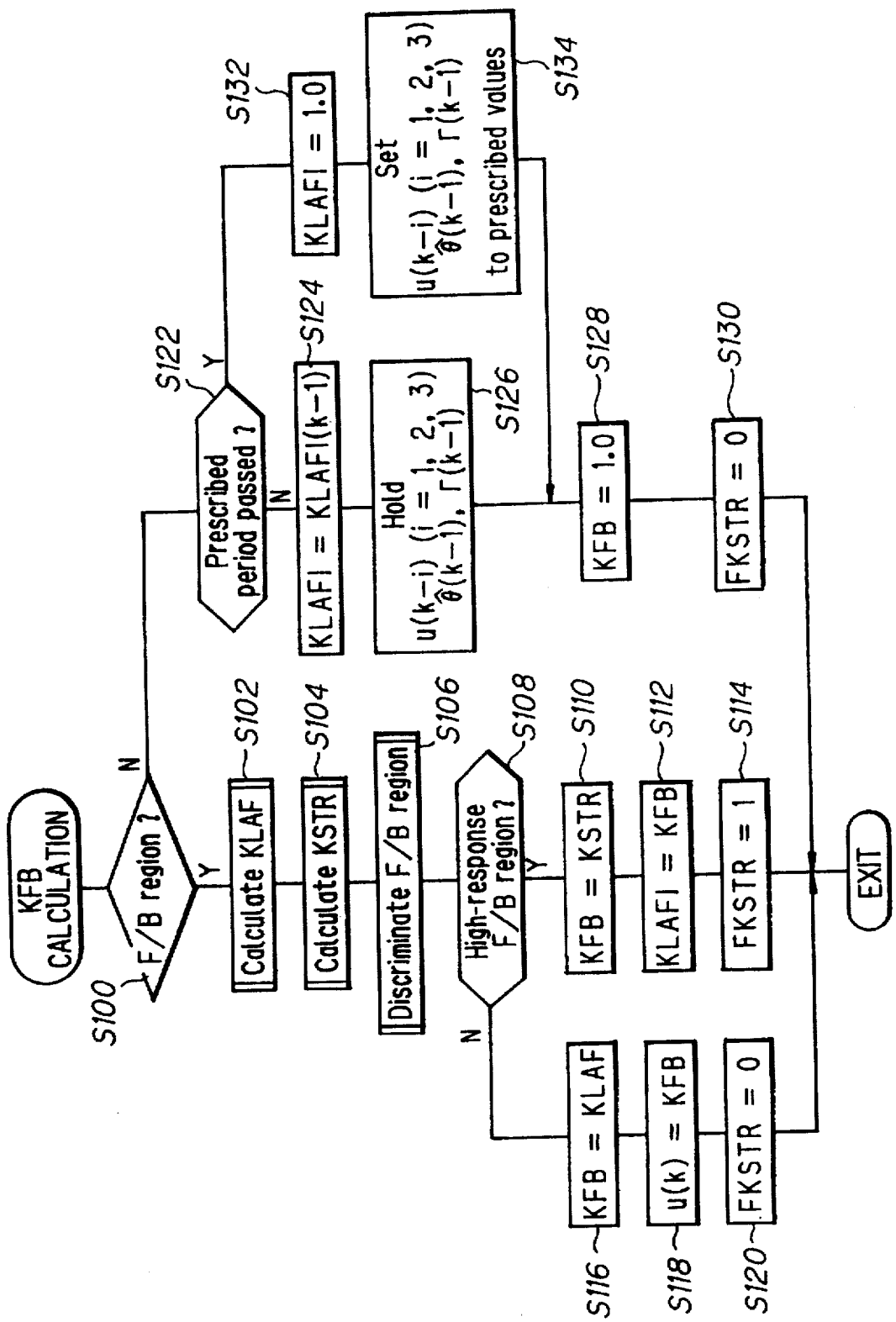
FIG. 6 is a subroutine flowchart of FIG. 4 showing the calculation of a feedback correction coefficient KFB.

The subroutine for this calculation is shown by the flowchart of FIG. 6.

The program begins at S100 in which a discrimination is made as to whether or not the engine operating condition is in a feedback control region. This is conducted using a separate subroutine not shown in the drawings. Open loop control is implemented, for example, when the engine operating condition has changed suddenly, such as during full-load enrichment, high engine speed, or when the exhaust gas recirculation mechanism is operating.

If the result in S100 is YES, the program proceeds to S102 in which the feedback correction coefficient KLAF is calculated using the PID control law. This will hereinafter be referred to as the "PID correction coefficient" or "KLAF". The feedback correction coefficient KLAF determined by the PID control law is calculated as follows. First, the control error DKAF between the desired air/fuel ratio KCMD and the detected air/fuel ratio KACT is calculated as:

$$DKAF(k)=KCMD(k-d')-KACT(k).$$

In this equation, KCMD(k−d′) is the desired air/fuel ratio (in which d′ indicates the dead time before KCMD is reflected in KACT and thus signifies the desired air/fuel ratio before the dead time control cycle), and KACT(k) is the detected air/fuel ratio (in the current control (program) cycle). In this embodiment, however, the desired value KCMD and the detected value KACT are represented as the equivalence ratio so as to facilitate the calculation, namely, as Mst/M= 1/lambda (Mst: stoichiometric air/fuel ratio, M=A/F (A: air mass flow rate, F: fuel mass flow rate), and lambda=excess air factor).

Next, the control error DKAF(k) is multiplied by specific coefficients to obtain variables, i.e., the P (proportional) term KLAFP(k), I (integral) term KLAFI(k), and D (differential or derivative) term KLAFD(k) as P term:$KLAFP(k)=DKAF(k) \times KP$ I term:$KLAFI(k)=KLAFI(k-1)+DKAF(k) \times KI$ D term:$KLAFD(k)=(DKAF(k)-DKAF(k-1)) \times KD$.

Thus, the P term is calculated by multiplying the error by the proportional gain KP, the I term is calculated by adding the value of KLAFI(k−1), the feedback correction coefficient in the preceding control cycle (k−1), to the product of the error and the integral gain KI, and the D term is calculated by multiplying the difference between the value of DKAF(k), the error in the current control cycle (k), and the value of DKAF(k−1), the error in the preceding control cycle (k−1), by the differential gain KD. The gains KP, KI and KD are calculated based on the engine speed and the engine load. Specifically, they are retrieved from a map using the engine speed Ne and the manifold pressure Pb as address data. Finally, KLAF(k), the value of the feedback correction coefficient according to the PID control law in the current control cycle, is calculated by summing the thus-obtained values:

$KLAF(k)=KLAFP(k)+KLAFI(k)+KLAFD(k)$.

In this case, the offset of 1.0 is assumed to be included in the I term KLAFI(k) so that the feedback correction coefficient is a multiplication coefficient (namely, the I term KLAFI(k) is given an initial value of 1.0).

The program then moves to S104 of the subroutine of FIG. 6, in which the feedback correction coefficient KSTR is calculated using the adaptive control law. This will hereinafter be referred to as the "adaptive correction coefficient" or "KSTR."

This calculation will now be explained. The adaptive controller shown in FIG. 5 comprises an adaptive controller constituted as an STR controller and an adaptation mechanism (system parameter estimator) for estimating/ identifying the controller parameters (system parameters). The desired value KCMD(k) and the controlled variable y(k) (plant output) of the fuel metering control feedback system are input to the STR controller, which receives a coefficient vector estimated/identified by the adaptation mechanism and generates the control input u(k).

One identification algorithm available for the adaptive control is that proposed by I. D. Landau et al. This method is described in, for example, *Computrol* (Corona Publishing Co., Ltd.) No. 27, pp. 28–41; *Automatic Control Handbook* (Ohm Publishing Co., Ltd.) pp. 703–707, "A Survey of Model Reference Adaptive Techniques—Theory and Applications" by I. D. Landau in *Automatica*, Vol. 10, pp. 353–379; "Unification of Discrete Time Explicit Model Reference Adaptive Control Designs" by I. D. Landau et al in *Automatica*, Vol. 17, No. 4, pp. 593–611; and "Combining Model Reference Adaptive Controllers and Stochastic Self-tuning Regulators" by I. D. Landau in *Automatica*, Vol. 18, No. 1, pp. 77–84.

The identification algorithm proposed by I. D. Landau et al. is used in the illustrated adaptive controller. In the identification algorithm proposed by I. D. Landau, if the polynomials of the denominator and numerator of the transfer function $B(Z^{-1})/A(Z^{-1})$ of the discrete controlled system are defined in the manner of Eq. 1-1 and Eq. 1-2 shown below, then the controller parameters or system (adaptive) parameters $\hat{\theta}(k)$ which are made up of parameters as shown in Eq. 1-3 and are expressed as a vector (transpose vector). And the input zeta (k) to the adaptation mechanism become that shown as Eq. 1-4. Here, there is taken as an example a plant in which m=1, n=1 and d=3, namely, the plant model is given in the form of linear system with three control cycles of dead time:.

$$A(Z^{-1}) = 1 + a_1 z^{-1} + \ldots + a_n z^{-n} \quad \text{Eq. 1-1}$$
$$B(Z^{-1}) = b_0 + b_1 z^{-1} + \ldots + b_m z^{-m} \quad \text{Eq. 1-2}$$

$$\begin{aligned}
\hat{\theta}^T(k) &= [\hat{b}_0(k), \hat{B}_R(z^{-1},k), \hat{S}(z^{-1},k)] \quad \text{Eq. 1-3}\\
&= [\hat{b}_0(k), \hat{r}_1(k), \ldots, r_{m+d-1}(k), s_0(k), \ldots, s_{n-1}(k)]\\
&= [b_0(k), r_1(k), r_2(k), r_3(k), s_0(k)]
\end{aligned}$$

$$\begin{aligned}
\zeta^T(k) &= [u(k), \ldots, u(k-m-d+1), y(k), \ldots, y(k-n+1)] \quad \text{Eq. 1-4}\\
&= [u(k), u(k-1), u(k-2), u(k-3), y(k)]
\end{aligned}$$

The controller parameter vector (controller parameters) $\hat{\theta}(k)$ is calculated by Eq. 2 below. In Eq. 2, $\Gamma(k)$ is a gain matrix (the (m+n+d)th order square matrix) that determines the estimation/identification speed of the controller parameters $\hat{\theta}$ and e asterisk is a signal indicating the generalized estimation/identification error. They are represented by recursion formulas such as those of Eqs. 3 and 4.

$$\hat{\theta}(k) = \hat{\theta}(k-1) + \Gamma(k-1)\zeta(k-d)e^*(k) \quad \text{Eq. 2}$$

$$\Gamma(k) = \frac{1}{\lambda_1(k)}\left[\Gamma(k-1) - \frac{\lambda_2(k)\Gamma(k-1)\zeta(k-d)\zeta^T(k-d)\Gamma(k-1)}{\lambda_1(k) + \lambda_2(k)\zeta^T(k-d)\Gamma(k-1)\zeta(k-d)}\right] \quad \text{Eq. 3}$$

$$e^*(k) = \frac{D(z^{-1})y(k) - \hat{\theta}^T(k-1)\zeta(k-d)}{1 + \zeta^T(k-d)\Gamma(k-1)\zeta(k-d)} \quad \text{Eq. 4}$$

Various specific algorithms are given depending on the selection of lambda$_1$, lambda$_2$ in Eq. 3. lambda 1(k)=1, lambda 2(k)=lambda (0<lambda<2) gives the gradually-decreasing gain algorithm (least square method when lambda=1) and lambda 1(k)=lambda 1 (0 <lambda 1<1), lambda 2(k)=lambda 2 (0 <lambda 2 <lambda) gives the variable-gain algorithm (weighted least square method when lambda 2=1). Further, defining lambda 1(k)/lambda 2(k)=σ and representing lambda 3 as in Eq. 5, the constant-trace algorithm is obtained by defining lambda 1(k)=lambda 3(k). Moreover, lambda 1(k)=1, lambda 2(k)=0 gives the constant-gain algorithm. As is clear from Eq. 3, in this case $\Gamma(k)=\Gamma(k-1)$, resulting in the constant value $\Gamma(k)=\Gamma$.

$$\lambda_3(k) = 1 - \frac{\|\Gamma(k-1)\zeta(k-d)\|^2}{\sigma + \zeta^T(k-d)\Gamma(k-1)\zeta(k-d)} \cdot \frac{1}{tr\Gamma(0)} \quad \text{Eq. 5}$$

In the diagram of FIG. 5, the STR controller (adaptive controller) and the adaptation mechanism (system parameter estimator) are placed outside the system for calculating the quantity of fuel injection and operate to calculate the feedback correction coefficient KSTR(k) so as to adaptively bring the detected value KACT(k) to the desired value KCMD(k−d') (where d' is the dead time before KCMD is reflected in KACT as mentioned repeatedly). In other words, the STR controller receives the coefficient vector θ̂(k) adaptively estimated/identified by the adaptation mechanism and forms a feedback compensator so as to bring it to the desired value KCMD(k−d'). The basic quantity of fuel injection Tim is multiplied other correction terms KCMDM(k), KTOTAL (both explained later) and the calculated feedback correction coefficient KSTR(k) and the corrected quantity of fuel injection is supplied to the controlled plant (internal combustion engine) as the output quantity of fuel injection Tout(k).

Thus the adaptive feedback correction coefficient KSTR (k) and the detected value KACT(k) are determined and input to the adaptation mechanism, which calculates the controller parameter vector θ̂(k) which are input to the STR controller. The desired value KCMD(k) is applied as input to the STR controller. Based on these variables, the STR controller uses a recursion formula to calculate the feedback correction coefficient KSTR(k) so as to bring the detected value KACT(k) to the desired value KCMD(k). The feedback correction coefficient KSTR(k) is specifically calculated as shown by Eq. 6:

$$KSTR(k) = \frac{KCMD(k-d') - s_0 \times y(k) - r_1 \times KSTR(k-1) - r_2 \times KSTR(k-2) - r_3 \times KSTR(k-3)}{b_0} \quad \text{Eq. 6}$$

As explained in the foregoing, the detected value KACT (k) and the desired value KCMD(k) are also input to the PID controller (illustrated as PID in the figure), which calculates the PID correction coefficient KLAF(k) based on PID control law explained in connection with S102 so as to eliminate the control error between the detected value at the exhaust system confluence point and the desired value. One or the other of the feedback correction coefficient KSTR obtained by the adaptive control law and the PID correction coefficient KLAF obtained using the PID control law is selected to be used in determining the fuel injection calculation quantity by a switching mechanism 400 shown in FIG. 5.

Calculations are carried out in parallel in the STR controller and the PID controller. Specifically, the adaptation mechanism indicated by Eqs. 2 to 4 is input with intermediate variables zeta (k−d), namely, with a vector lumping together the current and past control values u(k)(KSTR(k)) and y(k)(KACT(k)), and calculates the system parameters θ̂(k) from the cause and effect relationship therebetween. u(k) used here is the aforesaid feedback correction coefficient used in the fuel injection quantity calculation. Under a condition where PID control is to be conducted instead of adaptive control in the next control cycle, the PID correction coefficient KLAF is used as the feedback correction coefficient. While conducting PID control, even if the input u(k) to the adaptation mechanism is changed from the adaptive correction coefficient KSTR(k) to KLAF(k), since the plant output (controlled variable) generated as a result of corrected fuel injection quantity supplied to the engine, namely KACT(k+d'), is output and since the cause-effect relationship is therefore established between the input and output, the adaptation mechanism can calculate the controller parameter vector θ̂(k) without divergence. Thus, when θ̂(k) is input to Eq. 6, KSTR(k) is calculated. At this time, the replacement KSTR(k−i)=KLAF(k−i) is permissible in the calculation of KSTR(k) (i=1, 2, 3).

Thus, the adaptive correction coefficient KSTR can be calculated even when the PID controller is operating and it has been confirmed that the PID correction coefficient KLAF and the adaptive correction coefficient KSTR are substantially identical at any particular time. Since the values of the PID correction coefficient KLAF and the adaptive correction coefficient KSTR are close, moreover, the switch between them is smooth.

Returning to the explanation of the FIG. 6 flowchart, the program moves to S106 in which it is discriminated whether the operating region is one in which the feedback control is to be conducted using the high-control-response feedback correction coefficient (adaptive correction coefficient KSTR) or using the low-control-response feedback correction coefficient (PID correction coefficient KLAF).

Figure 7:
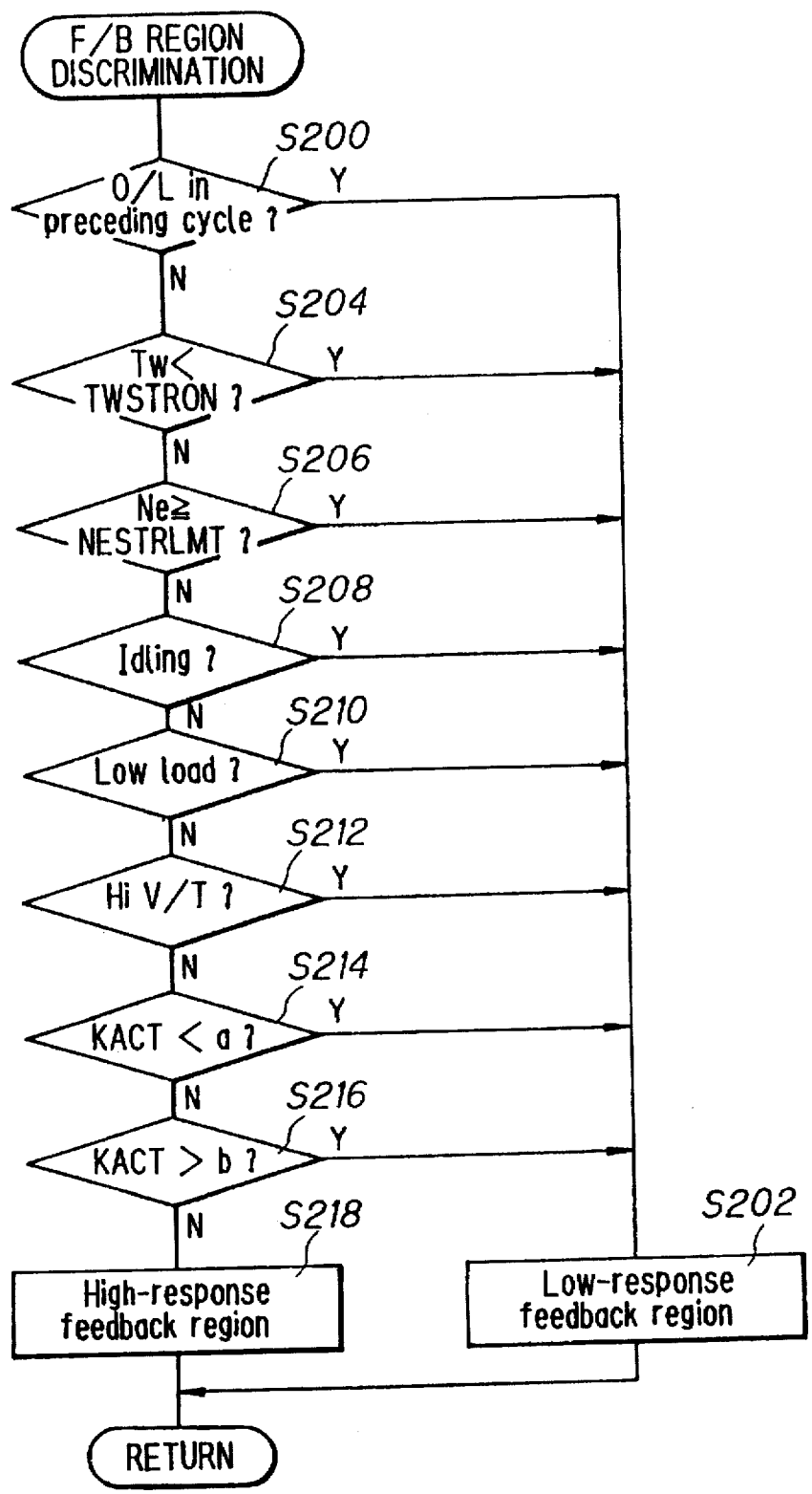
FIG. 7 is a subroutine flowchart of FIG. 6 showing the discrimination of a feedback control region.
Figure 11A:
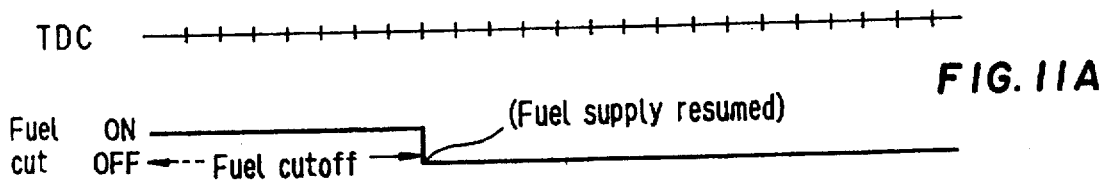
FIG. 11 is a timing chart showing the air/fuel ratio detection delay when the fuel supply is resumed after the fuel was cut off.
Figure 11B:
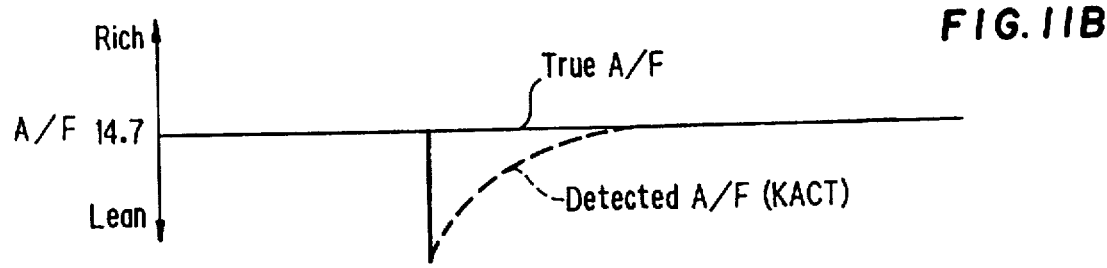
Figure 11C:
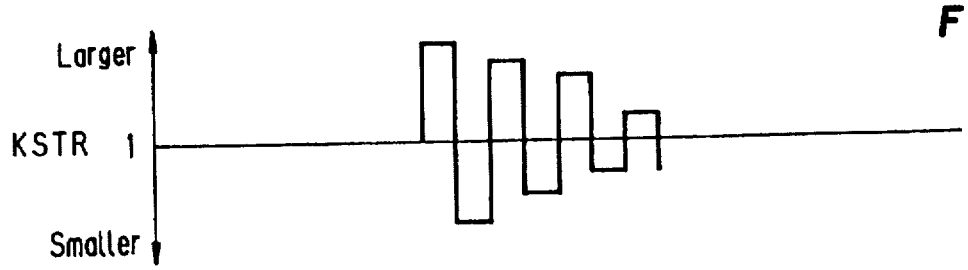
Figure 11D:
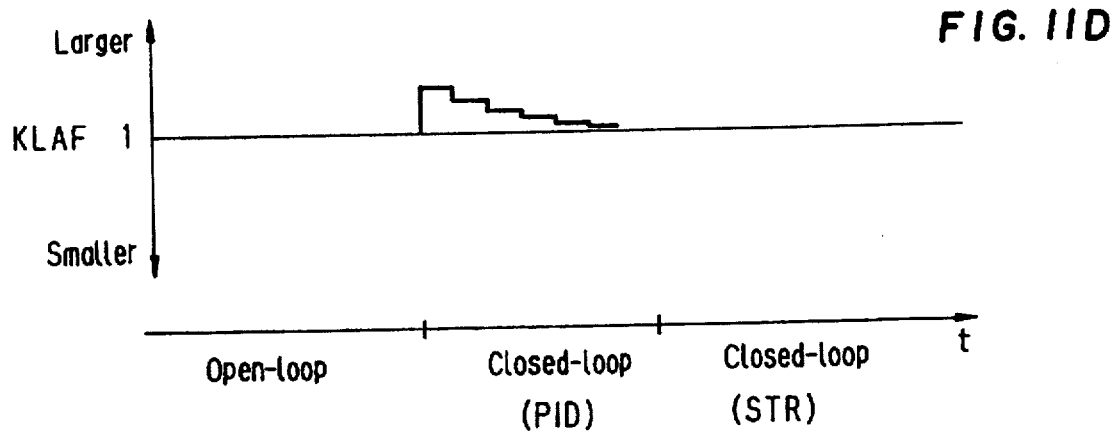

FIG. 7 is the flowchart of a subroutine for this region discrimination.

First, in S200, it is checked whether open-loop control was in effect at the preceding control cycle, i.e., at the time the subroutine of FIG. 4 was activated in the preceding control cycle. If the result is YES, the program goes to S202 in which the region is determined to be one in which feedback control is to be conducted using the low-control-response feedback correction coefficient (PID correction coefficient KLAF) (hereinafter referred to as the "low-response feedback region"). This is because, for the reason explained earlier, it is preferable not to conduct high-response feedback control immediately after returning from open-loop control. In changing from open-loop control to feedback control it is possible to conduct low-response feedback control for a prescribed period (5 TDCs, for example (TDC: Top Dead Center). In such case, it suffices to provide a discrimination step after S200 for continuously directing the program to S202 during the prescribed period.

If the result in S200 is NO, the program goes to S204 in which it is checked whether the engine coolant temperature Tw is less than a prescribed value TWSTRON. The prescribed value TWSTRON is set at a relatively low coolant temperature and if the detected engine coolant temperature TW is below the prescribed value TWSTRON, the program proceeds to S202 in which the engine operating condition is determined to be in the low-response feedback region. The reason for this is that the combustion is unstable at low coolant temperatures, making it impossible to obtain a stable detection of the value KACT owing to misfiring and the like. Although not shown in FIG. 7, for the same reason, the operating condition is also determined to be in the low-response feedback region when the coolant temperature is abnormally high.

If S204 finds that the engine coolant temperature TW is not lower than the prescribed value TWSTRON, the program advances to S206 in which it is checked whether the detected engine speed Ne is at or above a prescribed value NESTRLMT. The prescribed value NESTRLMT is set at a relatively high engine speed. If S206 finds that the detected engine speed Ne is at or above the prescribed value NESTRLMT, the program goes to S202 in which the operating condition is determined to be in the low-response feedback region. This is because during high-speed engine operation there tends to be insufficient time for calculation and, moreover, combustion is unstable.

If S206 finds that the detected engine speed Ne is lower than the prescribed value NESTRLMT, the program proceeds to S208 in which it is checked whether the engine is idling. If the result is YES, the program goes to S202 in which the operating condition is determined to be in the low-response feedback region. This is because the generally stable operating condition during idling obviates the need for a high gain such as that according to the adaptive control law.

If S208 finds that the engine is not idling, the program proceeds to S210 in which it is judged whether the engine load is low. If the result is YES, the program goes to S202 in which the operating condition is determined to be in the low-response feedback region. This is because combustion is not stable in the low engine load region.

If S210 finds that the engine load is not low, the program proceeds to S212 in which a check is made whether HiV/T (high-engine-speed side valve timing) is selected in the variable valve timing mechanism. If so, the program goes to S202 in which the operating condition is determined to be in the low-response feedback region. This is because the large amount of valve timing overlap present when the high-engine-speed side valve timing characteristic is selected is apt to cause intake air blowby (escape of intake air through the exhaust valve), in which case the detected value KACT is not likely to be stable. In addition, the detection delay of the LAF sensor cannot be ignored during high-speed operation.

The decision as to whether or not high-speed side valve timing is selected is made not only based on whether or not high-speed valve timing has actually been selected but also with reference to an appropriate flag indicating whether or not a command to switch the valve timing characteristics from the low-speed side to the high-speed side has been issued in a control unit (not shown) of the variable valve timing mechanism. This is because changes in valve timing characteristics may not be implemented at all cylinders simultaneously. During transient states and the like, therefore, cases may occur in which the valve timing characteristic temporarily differs between different cylinders. In other words, in switching the valve timing characteristic to the high-speed side, it is arranged such that the switch to the high-speed side is conducted in the control unit of the variable valve timing mechanism after confirmation that feedback control using the PID correction coefficient is in effect as a result of a discrimination that the engine operating condition is in the low-response feedback region.

If the result in S212 is NO, the program goes to S214 in which it is checked whether the detected air/fuel ratio KACT is below a prescribed value $\underline{a}$. If the result is YES, the program goes to S202. If NO, it goes to S216 in which a check is made as to whether the detected value KACT is greater than a prescribed value $\underline{b}$. If the result is YES, the program goes to S202. If NO, it goes to S218 in which the operating condition is determined to be in a region in which feedback control is to be conducted using a high-control-response feedback correction coefficient (feed back correction coefficient KSTR) (hereinafter referred to as the "high-response feedback region"). The prescribed values $\underline{a}$ and $\underline{b}$ are appropriately set for enabling discrimination of lean and rich air/fuel ratios since it is better to avoid high-response control such as adaptive control when the air/fuel ratio is lean or rich. In making the discrimination, the desired air/fuel ratio can be used in place of the detected air/fuel ratio for comparison with the prescribed values.

Returning to the subroutine of FIG. 6, it is then checked in S108 whether the region is determined to be the high-control-response feedback region. If the result is YES, the feedback correction coefficient KFB is set to the adaptive feedback correction coefficient KSTR in S110, whereafter the I term KLAFI of the PID correction coefficient is set to or replaced with the feedback correction coefficient KFB in S112. The reason for this is that the I term (integral term) may change suddenly when the adaptive correction coefficient KSTR is switched to the PID correction coefficient KLAF in the next control cycle. By determining the initial value of the I term of the PID correction coefficient KLAF using the value of the adaptive correction coefficient KSTR in this way, the difference in level between the adaptive correction coefficient and the PID correction coefficient can be reduced to prevent sudden change in the controlled variable and ensure stable control. Next, in S114, the bit of a flag FKSTR is set to 1 to indicate that the quantity of fuel injection is corrected using the adaptive correction coefficient KSTR.

On the other hand, if S108 finds that the operating condition is not in the high-response region, the feedback correction coefficient KFB is set to the PID correction coefficient KLAF in S116 and the plant input u(k) is set to the feedback correction coefficient KFB in S118 (which will be input to the STR controller as shown in FIG. 5). This is because even outside the STR control region the STR controller continues to operate using the PID correction coefficient KLAF. The bit of the flag FKSTR is then reset to 0 in S120.

If S100 finds that the operating condition is not in the feedback region, the program goes to S122 in which a check is made as to whether or not a prescribed period or time has passed since leaving the feedback region. If the result is NO, the program goes to S124 where the value of KLAFI in the current control cycle is set to or replaced with KLAFI(k−1), the value of the I term in the preceding control cycle, which is to say that the I term is held. Next, in S126, the internal variables (intermediate variables) of the adaptive controller are similarly held at the preceding value, i.e., the final value during adaptive control.

This is because, as shown in FIG. 5, the calculation of zeta(k) uses the plant input $\underline{u}$, not only the control input u(k) at the current control cycle but also u(k−1) and other past values in preceding control cycles. Therefore, $\underline{i}$ of u(k−i) in S126 is a comprehensive symbol encompassing the current and past control values. The procedure at S126 thus means that u(k), u(k−1), u(k−2) and u(k−3), more precisely, u(k−1), u(k−2), u(k−3) and u(k−4) are held. The controller parameters $\hat{\theta}$ and the gain matrix $\Gamma$ are simply held at their preceding values. In a case such as when the controller parameters (controller parameter vector) $\hat{\theta}$ and the gain matrix $\Gamma$ are stored in memory as mapped values, the map value can be used in place of the held value. Further, though not shown in the drawings, KSTR and KACT are also held at the final values in adaptive control. KACT and input u(k−i) can of course be lumped together and held as zeta.

Next, in S128, the value of the feedback correction coefficient KFB is set to 1.0, which is to say that feedback control is not conducted. The bit of the flag FKSTR is then reset to 0 in S130.

On the other hand, if S122 finds that the prescribed period has passed since leaving the feedback region, the value of the I term KLAFI is set to 1.0 (initial value) in S132, whereafter the plant input $\underline{u}$, the controller parameters $\hat{\theta}$ and the gain matrix $\Gamma$ F are set to prescribed values, e.g., their initial values in S134. The plant input $\underline{u}$ is specifically set to u(k)=u(k−1)=u(k−3)=1.

This is related to a frequently encountered situation. Namely, shortly after the accelerator pedal has once been released, fuel cutoff effected and open-loop control implemented, it often happens that the accelerator pedal is soon depressed again, causing the engine to accelerate and feedback control to be resumed. When feedback control is resumed after only a short time in this way, almost no change arises in the operating condition of the engine between before and after the non-operating region of the STR controller and, therefore, the cause-effect relationship with the combustion history naturally holds.

In the case of a transitory region of this kind, therefore, holding the internal variables of the adaptive controller improves the control stability by maintaining the continuity of the adaptive control and enabling the adaptive control to be conducted without unnecessarily returning to the initial state. In this sense, the prescribed period referred to regarding S122 defines a time range during which the cause-effect relationship with the combustion history continues to hold. The term "period" used here is defined to include both intervals measured in time and intervals measured in control (program) cycles (number of combustion cycles, TDCs etc.).

When the prescribed period or longer has passed, on the other hand, in can be assumed that a large change has occurred in the operating state of the engine between before and after the non-operating region of the STR controller. In this case, therefore, the I term of the PID correction coefficient is set to 1.0 in S132 and the internal variables are returned to prescribed values, for instance, their initial values, in S134. An initial value of $\hat{\theta}(k-1)$ and $u(k)$ (=KSTR (k)) can be stored in memory for each operating region of the internal combustion engine and the stored values can be used as the past values of $\hat{\theta}(k-1)$ and zeta $(k-d)$. This further improves the control performance at resumption of adaptive control. In addition, $\hat{\theta}(k)$ can be learned for each operating region.

Next, in S26 of the routine of FIG. 4, the basic quantity of fuel injection Tim is multiplied by a value KCMDM (explained later), the calculated feedback correction coefficient KFB and the correction coefficients KTOTAL, and the addition term TTOTAL is added to the result to obtain the corrected output quantity of fuel injection Tout in the manner described earlier. The output quantity fuel injection Tout is then output to the drive circuit 82 of the fuel injector 22 as the manipulated variable in S28.

Here, KCMDM is a correction coefficient and is determined based on the desired air/fuel ratio (more precisely the equivalence ratio) KCMD. Specifically, in order to correct the quantity of fuel injection by the desired air/fuel ratio through multiplication, the air/fuel ratio is determined as the equivalence ratio and is adjusted by charging efficiency. More specifically, the charging efficiency of intake air varies as the evaporation heat varies. For this reason, the value KCMD is adjusted by this and is renamed as KCMDM. The other correction coefficients KTOTAL is the product of the coefficients of the various corrections for coolant temperature, etc., conducted by multiplication terms and TTOTAL indicates the total value of the various corrections for atmospheric pressure, etc., conducted by addition terms (but does not include the injector dead time, etc., which is added separately at the time of outputting the output quantity of fuel injection Tout).

Since open-loop control of the air/fuel ratio goes into effect if the result is NO in S18, in this case the value of the feedback correction coefficient KFB is set to 1.0 in S30 and the output quantity of fuel injection Tout is calculated in S26. Since open-loop control is also implemented when S12 finds that the engine is cranking, in this case the output quantity of fuel injection Tout is calculated retrieving the quantity of fuel injection at cranking Ticr in S32 and based on a start mode equation using Ticr in S34. If S14 finds that fuel cutoff is effected, the output quantity of fuel injection Tout is set to 0 in S36.

In this embodiment, when open-loop control of the fuel metering and air/fuel ratio is discontinued and feedback control is resumed, as in the case where the supply of fuel is resumed after once being cut off, the feedback correction coefficient is determined based on the PID control law for a prescribed period, as illustrated in FIG. 11. As a result, the feedback correction coefficient of high control response determined by the adaptive control law is not used during periods when the difference between the true air/fuel ratio and the detected air/fuel ratio is large owing to the time required for the supplied fuel to be combusted and to the detection delay of the sensor itself. The controlled variable therefore does not become unstable and degrade the stability of the control.

On the other hand, the convergence speed can be improved after the detected value has stabilized by using the feedback correction coefficient of high control response determined by the adaptive control law for operating the system so as to absorb the control error all at one time. A particularly notable feature of the embodiment is that an optimal balance is achieved between control stability and control convergence owing to the fact that the control convergence is improved by determining the manipulated variable as the product of the feedback correction coefficient and the basic value.

In addition, since the STR controller and the PID controller are operated in parallel while mutually replacing the internal variables so as to calculate the adaptive correction coefficient KSTR and the PID correction coefficient KLAF in parallel, the transition from the adaptive correction coefficient KSTR to the PID correction coefficient KLAF and vice versa can be smoothly conducted. Further, the fact that switching between the two types of correction coefficients can be conducted with desired timing makes it possible to achieve optimum switching, while the fact that the switching can be conducted without producing spikes in the air/fuel ratio results in improved fuel metering and air/fuel ratio control performance.

FIG. 8 shows a second embodiment of the invention, specifically a subroutine similar to that of FIG. 6 for calculating the feedback correction coefficient KFB.

In the second embodiment, the processing or calculation load is reduced by having the STR controller and the PID controller conduct parallel calculation only during transitions from the low-response feedback region to the high-response feedback region.

While the PID controller and the STR controller are both constantly maintained in operation for conducting calculations in the first embodiment, substantially the same effect can be obtained even if the STR controller is stopped and the adaptive correction coefficient KSTR is not calculated when the PID controller is in operation. In fact, an even greater effect can be obtained from the aspect of reducing the processing load.

As is clear from Eqs. 2 to 4, past values of the internal or intermediate variables are required for calculating the system parameters $\hat{\theta}(k)$. The converse of this is that the system parameters $\hat{\theta}(k)$ can be calculated insofar as the past values of the internal or intermediate variables are available. The past values of the internal or intermediate variables necessary for calculation include $\hat{\theta}(k-1)$, zeta $(k-d)$ and $\Gamma(k-1)$. As in the first embodiment, zeta $(k-d)$ can be generated by alternating between the PID correction coefficient KLAF and the adaptive correction coefficient KSTR.

Further, since $\Gamma(k-1)$ is the gain matrix determining the estimation/identification speed, a prescribed value such as the initial value can be used therefor. When $\hat{\theta}$ is held such that KSTR is 1.0 (initial value) or thereabout, it is preferable to divide $b_0$ by KLAF$(k-1)$, since the value KSTR$(k)$ calculated by Eq. 6 becomes KLAF$(k-1)$.

The subroutine of FIG. 8 will now be explained based on the foregoing assumptions. First, in S300, it is checked whether the operating condition is in the feedback control region. If the result is YES, the feedback region is discriminated in S302. The procedure for this is the same as that according to the subroutine of FIG. 7 in the first embodiment. Then it is checked in S304 whether the operating condition is in the high-response feedback region. If the result is YES, it is checked in S306 whether the bit of a flag FSTRC is set to 1. The bit of the flag FSTRC is set to 1 (from initial value 0) when the adaptive correction coefficient KSTR is calculated.

Immediately following return to the high-response feedback region from the low-response feedback region, for example, the result in S306 is NO and the internal variables of the adaptive controller are set in S308. This is carried out in the manner explained earlier regarding S134 of the subroutine of FIG. 6. Next, in S310, the adaptive correction coefficient KSTR is calculated by processing like that explained earlier regarding the first embodiment, whereafter the PID correction coefficient KLAF is calculated in S312 by processing like that explained earlier regarding the first embodiment.

Next, in S314, the value of a counter C is incremented and then it is checked in S316 whether the adaptive correction coefficient KSTR and the PID correction coefficient KLAF are approximately (or exactly) the same. If the result is NO, it is checked in S318 whether the counter value C exceeds a prescribed value Cref. If the result in S318 is NO, the feedback correction coefficient KFB is set to the PID correction coefficient KLAF in S320, whereafter the plant input u(k) is set to feedback correction coefficient KFB in S322. The bit of the flag FKSTR is then reset to 0 in S324 and the bit of a flag FSTRC is set to 1 in S326.

In the next program loop (control cycle), therefore, the result in S306 is YES and the result in S328 is NO, so that the program moves through S310 and the following steps and repeats the aforesaid processing until the result in S316 or S318 becomes YES. In other words, the adaptive correction coefficient KSTR and the PID correction coefficient KLAF are calculated in parallel during this period in S310 and S312.

Then, when the result in S316 or S318 becomes YES after a certain number of program loops, the feedback correction coefficient KFB is set to the adaptive correction coefficient KSTR in S332 and, for the reason explained earlier, the I term KLAFI is replaced with feedback correction coefficient KFB in S334, whereafter the bit of the flag FKSTR is set to 1 in S336, the bit of the flag FSTRC is set to 1 in S338, and the value of counter C is reset to 0 in S340. At the start of the next program loop, therefore, the result in S306 is YES, the result in S328 is also YES, and the adaptive correction coefficient KSTR is calculated in S330 using the same procedures as in the first embodiment.

On the other hand, if S304 finds that the operating condition is not in the high-response feedback region, the PID correction coefficient KLAF is calculated in S342 using the same procedures as in the first embodiment, the feedback correction coefficient KFB is set to the PID correction coefficient KLAF in S344, the plant input u(k) is set to the feedback correction coefficient KFB in S346, the bit of the flag FKSTR is reset to 0 in S348, and the bit of the flag FSTRC is set to 0 in S350.

When feedback control is resumed after open-loop control, therefore, the operating condition is first found to be in the low-response feedback region, parallel calculation of the adaptive correction coefficient KSTR and the PID correction coefficient KLAF is conducted only temporarily upon return to the high-response feedback region from the low-response feedback region, and only the adaptive correction coefficient KSTR is calculated after the values of the two coefficients have become substantially the same or after the passage of a prescribed number of control cycles (Cref).

If S300 finds that the operating condition is not in the feedback control region, the value of the feedback correction coefficient KFB is set to 1.0 in S352, the value of the I term KLAFI is set to 1.0 in S354, the bit of the flag FKSTR is reset to 0 in S356, and the bit of the flag FSTRC is also reset to 0 in S358.

In the second embodiment, parallel calculation of the adaptive correction coefficient KSTR and the PID correction coefficient KLAF is conducted only temporarily upon return to a high-response feedback region from the low-response feedback region and only the adaptive correction coefficient KSTR is calculated after the values of the two coefficients have become substantially the same or after the passage of a prescribed number of control cycles. As a result, it is possible to realize both smooth switching and a reduction in the processing load.

Alternatively, after the issuance of a command to switch from the PID correction coefficient KLAF to the adaptive correction coefficient KSTR, it is possible to calculate only the adaptive correction coefficient KSTR using the aforesaid zeta(k–d), $\Gamma(k-1)$ and $\hat{\theta}(k)$ during the prescribed number of control cycles. In other words, complete switchover to the adaptive correction coefficient KSTR can be effected after the quantity of fuel injection has been corrected using the PID correction coefficient KLAF during the prescribed number of cycles.

Moreover, instead of making the switch from KLAF(k) to KSTR(k) after the prescribed number of control cycles, it is possible to switch from KLAF(k) to KSTR(k), when KSTR (k) falls within a ranged defined as $KLAF(k)-\alpha \leq KSTR(k) \leq KLAF(k)+\beta$ has been established ($\alpha$, $\beta$: prescribed small values), namely after KSTR(k) becomes approximately equal to KLAF(k).

While it was explained that the feedback correction coefficient to be used for the injection quantity correction is switched from KLAF(k) to KSTR(k) when the result in S316 or S318 is YES, one or the other of S316 and S318 can be omitted.

FIG. 9 is a block diagram of a third embodiment of the invention and FIG. 10 is the flowchart of a subroutine for another method of calculating the feedback correction coefficient KFB in the third embodiment.

As shown in FIG. 9, the third embodiment has no PID controller but is provided with a second STR controller in addition to the STR controller of the first embodiment. (The STR controller corresponding to that in the first embodiment will be referred to as STR controller 1 and the second STR controller as STR controller 2.)

The relationship in control response between the feedback correction coefficient determined by the STR controller 1 (called the first adaptive correction coefficient KSTR) and the feedback correction coefficient determined by the STR controller 2 (called the second adaptive correction coefficient KSTRL) is defined as $$KSTR > KSTRL.$$

In other words, the gain of the second feedback correction coefficient KSTRL determined by the STR controller 2 is smaller and its control response is therefore lower.

The higher/lower gains (responses) of the STR controllers 1 and 2 are achieved by using different algorithms, namely, the variable-gain algorithm and the constant-gain algorithm. More specifically, the STR controller 1 uses the variable-gain algorithm to enhance convergence speed while the STR controller 2 uses the constant-gain algorithm to set the aforementioned gain matrix Γ to a lower gain, thus increasing stability. Instead, and more simply, it is possible to use the constant-gain algorithms in both controllers but make the gain matrix different. In this case it suffices to make:

Gain matrix Γ of STR controller 1>Gain matrix Γ of STR controller 2.

FIG. 10 is a subroutine flowchart showing the operation of the third embodiment. The subroutine according to FIG. 10 is similar to that of FIG. 6. Unless expressly stated otherwise, the steps of the subroutine of FIG. 10 conduct the same processing operations as the corresponding steps of FIG. 6.

First, in S400, it is discriminated whether the operating condition is in the feedback control region. If the result is YES, the second adaptive correction coefficient KSTRL and the first adaptive correction coefficient KSTR are calculated in S404 and S406 by the same procedures as explained regarding the earlier embodiments, whereafter the type of feedback region is discriminated in S408, and it is checked in S410 whether the operating condition is in the high-response feedback region, and if the result is YES, the feedback correction coefficient KFB is set to the first adaptive correction coefficient KSTR in S412 and the bit of the flag FKSTR is set to 1 in S414. If S410 finds that the operating condition is not in the high-response feedback region, the feedback correction coefficient KFB is set to the second adaptive correction coefficient KSTRL in S416 and the bit of the flag FKSTR is reset to 0 in S418.

On the other hand, if S400 finds that the operating condition is not in the feedback region, then, similarly to the subroutine of the first embodiment shown in FIG. 6, it is checked in S420 whether the prescribed period has passed since leaving the feedback region. If the result is NO, then, similarly to the subroutine of the first embodiment shown in FIG. 6, the values of the internal variables are held at the values of the preceding cycle in S422. The procedures with respect to the internal variables are conducted for both the first adaptive correction coefficient KSTR and the second adaptive correction coefficient KSTRL.

Next, in S424, the value of the feedback correction coefficient KFB is set to 1.0 and the bit of the flag FKSTR is then reset to 0 in S426. On the other hand, if the result in S420 is YES, the internal variables are set to prescribed values (the initial values) in S428. The values of the plant input u(k−), the system parameters θ̂(k−1) and the gain matrix Γ(k−1) among the internal variables are set to different prescribed values in the first and second adaptive correction coefficients KSTR and KSTRL (although identical values can be used except for gain matrix Γ(k−1)).

Since, as described in the foregoing, the third embodiment is configured to calculate two feedback correction coefficients, different in control response, in parallel using two types of control laws, which are both adaptive control laws, and selects one or the other thereof based on the engine operating condition, effects like those of the first embodiment can be obtained.

Although the third embodiment has been described as having two STR controllers, it is alternatively possible to use only one STR controller, use the constant-gain algorithm, and raise and lower the gain by changing the set value of Γ.

While PID control has been taken as an example in the first and second embodiments, it is permissible instead to appropriately set the KP, KI and KD gains for conducting PI control and to control only the I term. In other words, the PID control referred to in the specification is established insofar as it includes some of the gain terms.

While the air/fuel ratio, more precisely the equivalence ratio, has been used as the desired value in the first to third embodiments, the quantity of fuel injection can instead be used as the desired value.

While the correction coefficients KSTR and KLAF (KSTRL) have been calculated as multiplication coefficients (terms) in the first to third embodiments, they can instead be calculated as addition terms.

While the throttle valve is operated by a stepping motor in the first to third embodiments, it can instead be mechanically linked with the accelerator pedal and be directly operated in response to accelerator pedal depression.

Moreover, while the first to third embodiments have been described with respect to examples using one or more STRs as the adaptive controller(s), one or more MRACS (model reference adaptive control systems) can be used instead.

While the invention has thus been shown and described with reference to the specific embodiment, it should be note that the invention is in no way limited to the details of the described arrangements, changes and modifications may be made without departing from the scope of the appended claims.

What is claimed is:

1. A system for controlling fuel metering for an internal combustion engine, comprising:

air/fuel ratio detecting means for detecting an air/fuel ratio (KACT) of an exhaust gas of the engine;

engine operating condition detecting means for detecting an operating condition of the engine;

fuel injection quantity determining means for determining a quantity of fuel injection (Tim) to be supplied to the engine;

first feedback correction coefficient calculation means for calculating a first feedback correction coefficient (KSTR) using a first control law having an algorithm expressed in a recursion formula;

second feedback correction coefficient calculation means, for calculating a second feedback correction coefficient (KLAF(KSTRL)), whose control response is inferior to that of the first feedback correction coefficient, using a second control law;

switching means for switching the first feedback correction coefficient (KSTR) and the second feedback correction coefficient (KLAF(KSTRL)) therebetween; and feedback control means, for correcting a manipulated variable by the switched one of the feedback correction coefficients (KSTR or (KLAF(KSTRL)) to control fuel metering to bring on at least one of the detected air/fuel ratio (KACT) and the quantity of fuel injection (Tim) to a desired value (KCMD);

wherein said first and second feedback correction coefficient calculation means calculating the feedback correction coefficients (KSTR, KLAF(KSTRL)) at least in parallel with each other, wherein said first and second feedback correction coefficient calculation means calculate the feedback correction coefficients (KSTR, KLAF(KSTRL)) in parallel all the time, and wherein said switching means replaces at least one variable of the feedback correction coefficients (KSTR, KLAF (KSTRL)) with the other to calculate the other feedback correction coefficient (KLAF (KSTRL), KSTR).

2. A system for controlling fuel metering for an internal combustion engine, comprising:

an air/fuel ratio sensor installed at an exhaust system of the engine for detecting an air/fuel ratio (KACT) of an exhaust gas of the engine;

engine operating condition detecting means for detecting operating parameters of the engine including at least an engine speed and engine load;

fuel injection quantity determining means, operatively coupled to at least said engine operating condition detecting means, for determining a quantity of fuel injection (Tim) to be supplied to the engine based on the detected operating parameters of the engine;

first feedback correction coefficient calculation means, operatively coupled to at least said air/fuel ratio sensor, for calculating a first feedback correction coefficient (KSTR) using a first control law having an algorithm expressed in a recursion formula to correct the quantity of fuel injection based on at least an output of said air/fuel ratio sensor;

second feedback correction coefficient calculation means, operatively coupled to at least said air/fuel ratio sensor, for calculating a second feedback correction coefficient (KLAF(KSTRL)), whose control response is inferior to that of the first feedback correction coefficient, using a second control law to correct the quantity of fuel injection based on at least an output of said air/fuel ratio sensor;

selecting means, operatively coupled to said first and second feedback correction coefficient calculation means, for selecting either of the first feedback correction coefficient (KSTR) and the second feedback correction coefficient (KLAF(KSTRL));

correcting means, operatively coupled to said selecting means, for correcting the quantity of fuel injection by the selected feedback correction coefficients (KSTR, KLAF(KSTRL)) to bring a controlled variable obtained based on at least an output (KACT) of the air/fuel ratio sensor to a desired value (KCMD); and a fuel injector, operatively coupled to said correcting means, for injecting fuel into a cylinder of the engine based on the corrected quantity of fuel injection;

wherein:

said first and second feedback correction coefficient calculation means calculate the feedback correction coefficients (KSTR, KLAF(KSTRL)) concurrently in parallel with each other.

3. A system according to claim 2, wherein said first and second feedback correction coefficient calculation means calculate the feedback correction coefficients (KSTR, KLAF (KSTRL)) in parallel at a specific time.

4. A system according to claim 3, further including:
replacing means for replacing one variable to be used in a calculation of one of the feedback correction coefficient (KSTR, KLAF(KSTRL)) with a value to be used in a calculation of the other of the feedback correction coefficient (KLAF(KSTRL),KSTR) such that the one of the feedback correction coefficient (KSTR, KLAF (KSTRL)) is calculated using at least the replaced value.

5. A system according to claim 3, wherein the first control law having an algorithm expressed in a recursion formula is an adaptive control law.

6. A system according to claim 4, wherein said replacing means replaces at least one variable (KLAFI) of the second feedback correction coefficient (KLAF(KSTRL)) with the first feedback correction coefficient (KSTRL) such that the second feedback correction coefficient (KLAF(KSTRL)) is calculated using the replaced value to be close to the first feedback correction coefficient (KSTR), when said selecting means selects the second feedback correction coefficient (KLAF(KSTRL).

7. A system according to claim 6, wherein said replacing means replaces at least one variable (KLAFI) of the second feedback correction coefficient (KLAF(KSTRL)) with a past value of the first feedback correction coefficient (KSTRL).

8. A system according to claim 7, wherein the past value is that used for correcting the quantity of fuel injection.

9. A system according to claim 3, further including:
replacing means for replacing one of the feedback correction coefficients (KSTR, KLAF(KSTRL)) with the other such that one of the feedback correction coefficients KLAF(KSTRL),KSTR) is calculated from the other of the feedback correction coefficients (KSTAR, KLAF(KSTRL)).

10. A system according to claim 9, wherein said replacing means replaces one of the feedback correction coefficients (KSTR, KLAF(KSTRL)) with a past value of the other of the feedback correction coefficients (KLAF(KSTRL), KSTR).

11. A system according to claim 10, wherein the past value is that used for correcting the quality of fuel injection.

12. A system according to claim 3, wherein said correcting means corrects the quantity of fuel injection by the second feedback correction coefficient (KLAF(KSTRL)) when the detected air/fuel ratio (KACT) is within a predetermined range.

13. A system according to claim 12, wherein said predetermined range is 1.0 or thereabout in terms of an equivalence ratio.

14. A system according to claim 3, wherein first and second feedback correction coefficient calculation means calculate the feedback correction coefficients (KSTR, KLAF (KSTRL)), and said correcting means corrects the quantity of fuel injection by the second feedback correction coefficient (KLAF(KSTRL)) when an engine coolant temperature is less than a prescribed temperature.

15. A system according to claim 3, wherein first and second feedback correction coefficient calculation means calculate the feedback correction coefficients (KSTR, KLAF (KSTRL)), and said correcting means corrects the quantity of fuel injection by the second feedback correction coefficient (KLAF(KSTRL)) when the engine speed is not less than a prescribed speed.

16. A system according to claim 3, wherein first and second feedback correction coefficient calculation means calculate the feedback correction coefficients (KSTR, KLAF (KSTRL)), and said correcting means corrects the quantity of fuel injection by the second feedback correction coefficient (KLAF(KSTRL)) when the engine is idling.

17. A system according to claim 3, wherein first and second feedback correction coefficient calculation means calculate the feedback correction coefficients (KSTR, KLAF (KSTRL)), and said correcting means corrects the quantity of fuel injection by the second feedback correction coefficient (KLAF(KSTRL)) when the engine load is low.

18. A system according to claim 3, wherein said second feedback correction coefficient calculation means calculates the second feedback correction coefficient (KLAF) using a PID control law at least including one from among a proportional term, an integral term and a differential term.

19. A system according to claim 3, wherein said second feedback correction coefficient calculation means calculates the second feedback correction coefficient (KSTRL) using a control law having an algorithm expressed in a recursion formula.

20. A system according to claim 19, wherein the control law having an algorithm expressed in a recursion formula is an adaptive control law.

21. A system according to claim 3, wherein said correcting means corrects the quantity of fuel injection by multiplying the manipulated variable by one of the feedback correction coefficients (KSTR, KLAF(KSTRL)).

22. A system according to claim 2, further including:
replacing means for replacing one variable to be used in a calculation of one of the feedback correction coefficient (KSTR, KLAF(KSTRL)) with a value to be used in a calculation of the other of the feedback correction coefficient (KLAF(KSTRL), KSTR) such that the one of the feedback correction coefficient (KSTR, KLAF(KSTRL)) is calculated using at least the replaced value.

23. A system according to claim 22, wherein said replacing means replaces at least one variable (KLAFI) of the second feedback correction coefficient (KLAF(KSTRL)) with the first feedback correction coefficient (KSTRL) such that the second feedback correction coefficient (KLAF(KSTRL)) is calculated using the replaced variable to be close to the first feedback correction coefficient (KSTR), when said selecting means selects the second feedback correction coefficient (KLAF(KSTRL).

24. A system according to claim 23, wherein said replacing means replaces at least one variable (KLAFI) of the second feedback correction coefficient (KLAF(KSTRL)) with a past value of the first feedback correction coefficient (KSTRL).

25. A system according to claim 24, wherein the past value is that used for correcting the quantity of fuel injection.

26. A system according to claim 2, further including:
replacing means for replacing one of the feedback correction coefficients (KSTR, KLAF(KSTRL)) with the other such that one of the feedback correction coefficients (KLAF(KSTRL), KSTR) is calculated from the other of the feedback correction coefficients (KSTR, KLAF(KSTRL)).

27. A system according to claim 26, wherein said replacing means replaces one of the feedback correction coefficients (KSTR, KLAF(KSTRL)) with a past value of the other of the feedback correction coefficients (KLAF(KSTRL), KSTR).

28. A system according to claim 27, wherein the past value is that used for correcting the quality of fuel injection.

29. A system according to claim 2, wherein said correcting means corrects the quantity of fuel injection by the second feedback correction coefficient (KLAF(KSTRL)) when the detected air/fuel ratio (KACT) is within a predetermined range.

30. A system according to claim 29, wherein said predetermined range is 1.0 or thereabout in terms of an equivalence ratio.

31. A system according to claim 2, wherein first and second feedback correction coefficient calculation means calculate the feedback correction coefficients (KSTR, KLAF(KSTRL)) at least in parallel with each other, and said correcting means corrects the quantity of fuel injection by the second feedback correction coefficient (KLAF(KSTRL)) when an engine coolant temperature is less than a prescribed temperature.

32. A system according to claim 2, wherein first and second feedback correction coefficient calculation means calculate the feedback correction coefficients (KSTR, KLAF(KSTRL)) at least in parallel with each other, and said correcting means corrects the quantity of fuel injection by the second feedback correction coefficient (KLAF(KSTRL)) when the engine speed is not less than a prescribed speed.

33. A system according to claim 2, wherein first and second feedback correction coefficient calculation means calculate the feedback correction coefficients (KSTR, KLAF(KSTRL)) at least in parallel with each other, and said correcting means corrects the quantity of fuel injection by the second feedback correction coefficient (KLAF(KSTRL)) when the engine is idling.

34. A system according to claim 2, wherein said correcting mean corrects the quantity of fuel injection by the second feedback correction coefficient (KLAF(KSTRL)) when the engine load is low.

35. A system according to claim 2, wherein the first control law having an algorithm expressed in a recursion formula is an adaptive control law.

36. A system according to claim 2, wherein said second feedback correction coefficient calculation means calculates the second feedback correction coefficient (KLAF) using a PID control law at least including one from among a proportional term, an integral term and a differential term.

37. A system according to claim 2, wherein said second feedback correction coefficient calculation means calculates the second feedback correction coefficient (KSTRL) using a control law having an algorithm expressed in a recursion formula.

38. A system according to claim 37, wherein the control law having an algorithm expressed in a recursion formula is an adaptive control law.

39. A system according to claim 2, wherein said correcting means corrects the quantity of fuel injection by multiplying the manipulated variable by one of the feedback correction coefficients (KSTR, KLAF(KSTRL)).

40. A system for controlling fuel metering for an internal combustion engine, comprising:

an air/fuel ratio sensor installed at an exhaust system of the engine for detecting an air/fuel ratio (KACT) of an exhaust gas of the engine;

engine operating condition detecting means for detecting operating parameters of the engine including at least an engine speed and engine load;

fuel injection quantity determining means, operatively coupled to at least said engine operating condition detecting means, for determining a quantity of fuel injection (Tim) to be supplied to the engine based on the detected operating parameters of the engine;

first feedback correction coefficient calculation means, operatively coupled to at least said air/fuel ratio sensor, for calculating a first feedback correction coefficient (KSTR) using a first control law having an algorithm expressed in a recursion formula to correct the quantity of fuel injection based on at least an output of said air/fuel ratio sensor;

second feedback correction coefficient calculation means, operatively coupled to at least said air/fuel ratio sensor, for calculating a second feedback correction coefficient (KLAF(KSTRL)), whose control response is inferior to that of the first feedback correction coefficient using a second control law to correct the quantity of fuel injection based on at least an output of said air/fuel ratio sensor;

selecting means, operatively coupled to said first and second feedback correction coefficient calculation means, for selecting either of the first feedback correction coefficient (KSTR) and the second feedback correction coefficient (KLAF(KSTRL));

correcting means, operatively coupled to said selecting means, for correcting the quantity of fuel injection by the selected feedback correction coefficient (KSTR or KLAF(KSTRL)) to bring a controlled variable obtained based on at least an output (KACT) of the air/fuel ratio sensor to a desired value (KCMD); and a fuel injector, operatively coupled to said correcting means, for injecting fuel into a cylinder of the engine based on the corrected quantity of fuel injection;

wherein:

said first and second feedback correction coefficient calculation means calculate the feedback correction coefficients (KSTR, KLAF (KSTRL)) concurrently in parallel with each other under a specific engine operation.

41. A system according to claim 40, wherein said first and second feedback correction coefficient calculation means calculate the feedback correction coefficients (KSTRL, KLAF (KSTRL)) in parallel with each other when engine operation returns from a region in which the second feedback correction coefficient (KLAF(KSTRL)) is selected to a region in which the first feedback correction coefficient (KSTR) is selected.

42. A system according to claim 40, wherein the first control law having an algorithm expressed in a recursion formula is an adaptive control law.

43. A system according to claim 40, further including:

replacing means for replacing one variable to be used in a calculation of one of the feedback correction coefficient (KSTR, KLAF(KSTRL)) with a value to be used in a calculation of the other of the feedback correction coefficient (KLAF(KSTRL), KSTR) such that the one of the feedback correction coefficient (KSTR, KLAF (KSTRL)) is calculated using at least the replaced value.

44. A system according to claim 43, wherein said replacing means replaces at least one variable (KLAFI) of the second feedback correction coefficient (KLAF(KSTRL)) with the first feedback correction coefficient (KSTRL) such that the second feedback correction coefficient (KLAF (KSTRL)) is calculated using the replaced value to be close to the first feedback correction coefficient (KSTR), when said selecting means selects the second feedback correction coefficient (KLAF (KSTRL)).

45. A system according to claim 44, wherein said replacing means replaces at least one variable (KLAFI) of the second feedback correction coefficient (KLAF(KSTRL)) with a past value of the first feedback correction coefficient (KSTRL).

46. A system according to claim 45, wherein the past value is that used for correcting the quantity of fuel injection.

47. A system according to claim 40, further including:

replacing means for replacing one of the feedback correction coefficients (KSTR, KLAF(KSTRL)) with the other such that one of the feedback correction coefficients (KLAF(KSTRL), KSTR) is calculated from the other of the feedback correction coefficients (KSTR, KLAF(KSTRL)).

48. A system according to claim 47, wherein said replacing means replaces one of the feedback correction coefficients (KSTR, KLAF(KSTRL)) with a past value of the other of the feedback correction coefficients (KLAF (KSTRL), KSTR).

49. A system according to claim 48, wherein the past value is that used for correcting the quality of fuel injection.

50. A system according to claim 40, wherein said correcting means corrects the quantity of fuel injection by the second feedback correction coefficient (KLAF(KSTRL)) when the detected air/fuel ratio (KACT) is within a predetermined range.

51. A system according to claim 50, wherein said predetermined range is 1.0 or thereabout in terms of an equivalence ratio.

52. A system according to claim 40, wherein KLAF (KSTRL)) at least in parallel with each other, and said correcting means corrects the quantity of fuel injection by the second feedback correction coefficient (KLAF(KSTRL)) when an engine coolant temperature is less than a prescribed temperature.

53. A system according to claim 40, wherein said correcting means corrects the quantity of fuel injection by the second feedback correction coefficient (KLAF(KSTRL)) when the engine speed is not less than a prescribed speed.

54. A system according to claim 40, wherein said correcting means corrects the quantity of fuel injection by the second feedback correction coefficient (KLAF(KSTRL)) when the engine is idling.

55. A system according to claim 40, wherein said correcting mean corrects the quantity of fuel injection by the second feedback correction coefficient (KLAF(KSTRL)) when the engine load is low.

56. A system according to claim 40, wherein said second feedback correction coefficient calculation means calculates the second feedback correction coefficient (KLAF) using a PID control law at least including one from among a proportional term, an integral term and a differential term.

57. A system according to claim 40, wherein said second feedback correction coefficient calculation means calculates the second feedback correction coefficient (KSTRL) using a control law having an algorithm expressed in a recursion formula.

58. A system according to claim 57, wherein the control law having an algorithm expressed in a recursion formula is an adaptive control law.

59. A system according to claim 40, wherein said correcting means corrects the quantity of fuel injection by multiplying the manipulated variable by one of the feedback correction coefficients (KSTR, KLAF(KSTRL)).

60. A system according to claim 40, further including:

replacing means for replacing one of the feedback correction coefficients (KSTR, KLAF(KSTRL)) with the other such that one of the feedback correction coefficients (KLAF(KSTRL), KSTR) is calculated using the other feedback correction coefficient.

61. A system according to claim 60, further including:

replacing means for replacing one of the feedback correction coefficients (KSTR, KLAF(KSTRL)) with the other such that one of the feedback correction coefficients (KLAF(KSTRL), KSTR) is calculated from the other of the feedback correction coefficients (KSTR, KLAF(KSTRL)).

62. A system according to claim 61, wherein said replacing means replaces one of the feedback correction coefficients (KSTR, KLAF(KSTRL)) with a past value of the other of the feedback correction coefficients (KLAF (KSTRL), KSTR).

63. A system according to claim 62, wherein the past value is that used for correcting the quality of fuel injection.

64. A system according to claim 60, wherein said replacing means replaces at least one variable (KLAFI) of the second feedback correction coefficient (KLAF(KSTRL)) with the first feedback correction coefficient (KSTRL) such that the second feedback correction coefficient (KLAF (KSTRL)) is calculated using the replaced variable to be close to the first feedback correction coefficient (KSTR), when said selecting means selects the second feedback correction coefficient (KLAF(KSTRL).

65. A system according to claim 64, wherein said replacing means replaces at least one variable (KLAFI) of the second feedback correction coefficient (KLAF(KSTRL)) with a past value of the first feedback correction coefficient (KSTRL).

66. A system according to claim 64, wherein the past value is that used for correcting the quantity of fuel injection.

67. A system for controlling fuel metering for an internal combustion engine, comprising:

air/fuel ratio detecting means for detecting an air/fuel ratio (KACT) of an exhaust gas of the engine;

engine operating condition detecting means for detecting an operating condition of the engine;

fuel injection quantity determining means for determining a quantity of fuel injection (Tim) to be supplied to the engine;

first feedback correction coefficient calculation means for calculating a first feedback correction coefficient (KSTR) using a first control law having an algorithm expressed in a recursion formula;

second feedback correction coefficient calculation means, for calculating a second feedback correction coefficient (KLAF(KSTRL)), whose control response is inferior to that of the first feedback correction coefficient, using a second control law;

switching means for switching the first feedback correction coefficient (KSTR) and the second feedback correction coefficient (KLAF(KSTRL)) therebetween; and feedback control means, for correcting a manipulated variable by the switched one of the feedback correction coefficients (KSTR or (KLAF(KSTRL)) to control fuel metering to bring on at least one of the detected air/fuel ratio (KACT) and the quantity of fuel injection (Tim) to a desired value (KCMD); wherein said first and second feedback correction coefficient calculation means calculating the feedback correction coefficients (KSTR, KLAF(KSTRL)) at least in parallel with each other and wherein said switching means replaces at least one variable of the feedback correction coefficients (KSTR, KLAF(KSTRL)) with the other to calculate the other feedback correction coefficient (KLAF(KSTRL), KSTR).

68. A system according to claim 67, wherein said switching means replaces one of the feedback correction coefficients (KSTR, KLAF(KSTRL)) with the other feedback correction coefficient (KLAF(KSTRL), KSTR).

69. A system according to claim 68, wherein said switching means replaces one feedback correction coefficient (KSTR, KLAF(KSTRL)) with a past value of the other feedback correction coefficient (KLAF(KSTRL), KSTR).

70. A system according to claim 69, wherein the past value is that used in the correction of the manipulated variable.

71. A system according to claim 67, wherein said switching means replaces at least one variable (KLAFI) of the second feedback correction coefficient (KLAF(KSTRL)) with the first feedback correction coefficient (KSTRL) such that a value of the second feedback correction coefficient (KLAF(KSTRL)) is closer to the first feedback correction coefficient (KSTR), when said switching means switches feedback correction coefficients from the first feedback correction coefficient (KSTR) to the second feedback correction coefficient (KLAF(KSTRL).

72. A system according to claim 71, wherein said switching means replaces at least one variable (KLAFI) of the second feedback correction coefficient (KLAFI(KSRL)) with a past value of the first feedback coefficient (KSTRL).

73. A system according to claim 72, wherein the past value is that used in the correction of the manipulated variable.

\* \* \* \* \*

UNITED STATES PATENT AND TRADEMARK OFFICE
CERTIFICATE OF CORRECTION

Page 1 of 2

PATENT NO. : 5,720,265
DATED : February 24, 1998
INVENTOR(S) : Maki et al.

It is certified that error appears in the above-identified patent and that said Letters Patent is hereby corrected as shown below:

Column 19, line 44, delete "at a specific" insert therefor -- all the --

Column 20, line 18; delete "quality" insert therefor -- quantity --

Column 21, line 42; delete "quality" insert therefor -- quantity --

Column 21, lines 66-67, delete "first and second feedback correction coefficient calculation means"

Column 22, lines 1-2, delete "calculate the feedback correction coefficients (KSTR.KLAF(KSTRL)) at least in parallel with each other, and"

Column 23, line 4, delete "infecting" insert therefor -- injecting --

UNITED STATES PATENT AND TRADEMARK OFFICE
CERTIFICATE OF CORRECTION

PATENT NO. : 5,720,265

DATED : February 24, 1998

INVENTOR(S) : Maki et al.

It is certified that error appears in the above-identified patent and that said Letters Patent is hereby corrected as shown below:

Column 23, line 62; delete "quality" insert therefor

-- quantity --

Column 24, lines 4-5, delete "KLAF(KSTRL)) at least in parallel with each other, and"

Column 24, line 58, delete "quality" insert therefor

-- quantity --

Signed and Sealed this

Sixteenth Day of March, 1999

Attest:

Attesting Officer

Q. TODD DICKINSON

Acting Commissioner of Patents and Trademarks